(12) United States Patent
Yu et al.

(10) Patent No.: US 12,413,254 B2
(45) Date of Patent: Sep. 9, 2025

(54) ELECTRONIC DEVICE INCLUDING ANTENNA

(71) Applicant: SAMSUNG ELECTRONICS CO., LTD., Suwon-si (KR)

(72) Inventors: Changha Yu, Suwon-si (KR); Yunsik Kim, Suwon-si (KR); Woosuk Kang, Suwon-si (KR); Mincheol Seo, Suwon-si (KR); Gyubok Park, Suwon-si (KR); Donghun Shin, Suwon-si (KR); Minkyung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 18/098,332

(22) Filed: Jan. 18, 2023

(65) Prior Publication Data
US 2023/0253992 A1 Aug. 10, 2023

Related U.S. Application Data

(63) Continuation of application No. PCT/KR2022/020297, filed on Dec. 14, 2022.

(30) Foreign Application Priority Data
Feb. 8, 2022 (KR) .................. 10-2022-0016196

(51) Int. Cl.
*H04B 1/00* (2006.01)
*H01Q 1/24* (2006.01)
(Continued)

(52) U.S. Cl.
CPC ........... *H04B 1/0064* (2013.01); *H01Q 1/243* (2013.01); *H01Q 1/48* (2013.01); *H01Q 9/045* (2013.01); *H01Q 21/30* (2013.01); *H04M 1/0277* (2013.01)

(58) Field of Classification Search
CPC ........ H04B 1/0064; H01Q 1/243; H01Q 1/48; H01Q 9/045; H01Q 21/30; H01Q 5/328;
(Continued)

(56) References Cited

U.S. PATENT DOCUMENTS 11,043,734 B2 * 6/2021 Ha ........................... H01Q 1/48
RE48,738 E * 9/2021 Kwak ..................... H01Q 5/371
(Continued)

FOREIGN PATENT DOCUMENTS

CN 113782974 A 12/2021
KR 10-2017-0007086 A 1/2017
(Continued)

OTHER PUBLICATIONS

International Search Report dated Mar. 21, 2023 for KR Application No. KR/2022/020297.
(Continued)

*Primary Examiner* — Nizar N Sivji
(74) *Attorney, Agent, or Firm* — Nixon & Vanderhye P.C.

(57) ABSTRACT

An electronic device may include a housing including a first side surface and a second side surface; a support member disposed inside the housing and connected to a part of the first and second side surfaces; a first opening formed between the first side surface and the support member, and a second opening formed among a part of the first side surface, the second side surface, and the support member; a printed circuit board disposed on the support member and having a ground; a first conductive portion disposed between a first segmenting portion formed in the first side surface and a second segmenting portion formed in the second side surface, and including a first ground portion, a first feeding point, a first point, and/or a second point; a second conductive portion disposed between the first segmenting portion and a third segmenting portion formed in the first side
(Continued)

surface, and including a second feeding point, a second ground portion, a third feeding point, and/or a third ground portion; a wireless communication circuit electrically connected to the first feeding point, the second feeding point, and/or the third feeding point; a processor electrically connected to the wireless communication circuit; and a first matching circuit electrically connected to the ground and the first point and/or a second matching circuit electrically connected to the ground and the second point, wherein the first conductive portion and at least a part of the second conductive portion may be configured to operate as at least one antenna, depending on an operation of the first matching circuit or the second matching circuit corresponding to control of the processor. Other various embodiments are possible.

20 Claims, 19 Drawing Sheets

(51) Int. Cl.
    *H01Q 1/48*     (2006.01)
    *H01Q 9/04*     (2006.01)
    *H01Q 21/30*     (2006.01)
    *H04M 1/02*     (2006.01)

(58) Field of Classification Search
    CPC .. H01Q 5/35; H01Q 1/38; H01Q 1/46; H04M 1/0277; H04M 1/02; H04M 1/026
    See application file for complete search history.

(56) References Cited

U.S. PATENT DOCUMENTS

| | | | |
|---|---|---|---|
| 11,362,699 B2 * | 6/2022 | Jung | H04M 1/0202 |
| 2014/0210675 A1 * | 7/2014 | Hwang | H01Q 1/44 |
| | | | 343/702 |
| 2015/0123857 A1 * | 5/2015 | Park | H01Q 21/30 |
| | | | 343/702 |
| 2016/0104930 A1 * | 4/2016 | Lee | H01Q 1/243 |
| | | | 343/702 |
| 2017/0201014 A1 * | 7/2017 | Lee | H01Q 1/44 |
| 2018/0026337 A1 | 1/2018 | Chen et al. | |
| 2018/0026361 A1 | 1/2018 | Sakong et al. | |
| 2018/0288203 A1 | 10/2018 | Jeon et al. | |
| 2020/0266524 A1 * | 8/2020 | Yoon | G06F 1/1681 |
| 2020/0321988 A1 | 10/2020 | Kim et al. | |
| 2021/0135351 A1 | 5/2021 | Son et al. | |
| 2021/0391642 A1 | 12/2021 | Yoon et al. | |
| 2022/0015226 A1 | 1/2022 | Kim et al. | |
| 2022/0166867 A1 | 5/2022 | Nam et al. | |
| 2024/0097324 A1 * | 3/2024 | Xu | H01Q 5/35 |

FOREIGN PATENT DOCUMENTS

| | | |
|---|---|---|
| KR | 10-2018-0010957 A | 1/2018 |
| KR | 10-2018-0109509 A | 10/2018 |
| KR | 10-2020-0101234 A | 8/2020 |
| KR | 10-2021-0054262 A | 5/2021 |
| KR | 10-2022-0007947 A | 1/2022 |
| WO | WO 2019/218167 A1 | 11/2019 |

OTHER PUBLICATIONS

Notification of Publication dated Aug. 17, 2023 for KR Application No. KR/2022/020297.
Extended European Search Report dated Mar. 26, 2025 for EP Application No. 22926213.4.

* cited by examiner

ELECTRONIC DEVICE INCLUDING ANTENNA

CROSS-REFERENCE TO RELATED APPLICATIONS

This application is a continuation of International Application No. PCT/KR2022/020297, filed on Dec. 14, 2022, designating the United States, in the Korean Intellectual Property Receiving Office, and claiming priority to KR Patent Application No. 10-2022-0016196 filed on Feb. 8, 2022, the disclosures of which are all hereby incorporated by reference herein in their entireties.

BACKGROUND

Field

Various example embodiments relate to an electronic device including at least one antenna.

Description of Related Art

The use of an electronic device such as a smart phone of bar type, foldable type, rollable type or sliding type, or a tablet PC is increasing, and various functions are provided to the electronic device.

The electronic device may transmit and receive a phone call and various data with another electronic device through wireless communication.

In order to perform wireless communication with another electronic device using a network, the electronic device may include at least one antenna.

SUMMARY

At least a portion of a housing forming the exterior of the electronic device may be formed of a conductive material (e.g., metal).

At least the portion of the housing formed of the conductive material may be used as an antenna (e.g., antenna radiator) for performing wireless communication. For example, the housing of the electronic device may be divided through at least one segmenting portion (e.g., a slit) and be used as at least one antenna.

In order to provide various services, the electronic device may additionally form a segmenting portion in the housing and thereby increase the number of antennas. Increasing the number of segmenting portions in the housing of the electronic device may decrease competitiveness in design of the electronic device and strength against external impacts.

The electronic device may include a laser direct structuring (LDS) antenna patterned inside the housing. The LDS antenna may have a limited area to be mounted inside the housing and may reduce a space for arranging electronic components inside the housing.

Various example embodiments may provide an electronic device capable of supporting a variety of frequency bands by allowing a plurality of antennas (e.g., conductive portions) to use one segmenting portion formed in a housing.

The technical problems to be achieved are not limited to the above-mentioned problems, and other technical problems not mentioned are clearly understood from the following description by a person skilled in the art to which the disclosure belongs.

According to various example embodiments, an electronic device may include a housing including a first side surface and a second side surface; a support member disposed inside the housing and connected, directly or indirectly, to a part of the first and second side surfaces; a first opening formed between the first side surface and the support member, and a second opening formed among a part of the first side surface, the second side surface, and the support member; a printed circuit board disposed on the support member and having a ground; a first conductive portion disposed between a first segmenting portion formed in the first side surface and a second segmenting portion formed in the second side surface, and including a first ground portion, a first feeding point, a first point, and/or a second point; a second conductive portion disposed between the first segmenting portion and a third segmenting portion formed in the first side surface, and including a second feeding point, a second ground portion, a third feeding point, and/or a third ground portion; a wireless communication circuit electrically connected, directly or indirectly, to the first feeding point, the second feeding point, and/or the third feeding point; a processor electrically connected, directly or indirectly, to the wireless communication circuit; and a first matching circuit electrically connected, directly or indirectly, to the ground and the first point and/or a second matching circuit electrically connected, directly or indirectly, to the ground and the second point, wherein the first conductive portion and at least a part of the second conductive portion may be configured to operate as at least one antenna, depending on an operation of the first matching circuit or the second matching circuit corresponding to control of the processor.

According to various example embodiments, an electronic device may include a housing including a first side surface and a second side surface; a support member disposed inside the housing and connected to a part of the first and second side surfaces; a first opening formed between the first side surface and the support member, and a second opening formed among a part of the first side surface, the second side surface, and the support member; a printed circuit board disposed on the support member and having a ground; a first conductive portion disposed between a first segmenting portion formed in the first side surface and a second segmenting portion formed in the second side surface, and including a first ground portion, a first feeding point, a first point, and/or a second point; a second conductive portion disposed between the first segmenting portion and a third segmenting portion formed in the first side surface, and including a second feeding point, a second ground portion, a third feeding point, and/or a third ground portion; a wireless communication circuit electrically connected to the first feeding point, the second feeding point, and/or the third feeding point; a processor electrically connected to the wireless communication circuit; and a first matching circuit electrically connected to the ground and the first point and/or a second matching circuit electrically connected to the ground and the second point, wherein depending on an operation of the first matching circuit or the second matching circuit corresponding to control of the processor, the first conductive portion electrically connected to the first and second matching circuits and a part included in the second conductive portion and corresponding to the second ground portion may be configured to operate as a first antenna, and wherein a part from the second ground portion included in the second conductive portion to the second point included in the first conductive portion and electrically connected to the second matching circuit may be configured to operate as a second antenna.

According to various example embodiments, because a plurality of antennas share and use one segmenting portion formed in a housing, it is possible to reduce the number of segmenting portions formed in the housing, improve design competitiveness, and secure strength against external impacts.

In addition, various effects will be explicitly or implicitly provided in the disclosure.

BRIEF DESCRIPTION OF DRAWINGS

In connection with the description of the drawings, the same or similar reference numerals may be used for the same or similar components. The above and other aspects, features, and advantages of certain example embodiments will be more apparent from the following detailed description, taken in conjunction with the accompanying drawings, in which.

DETAILED DESCRIPTION

Figure 1:
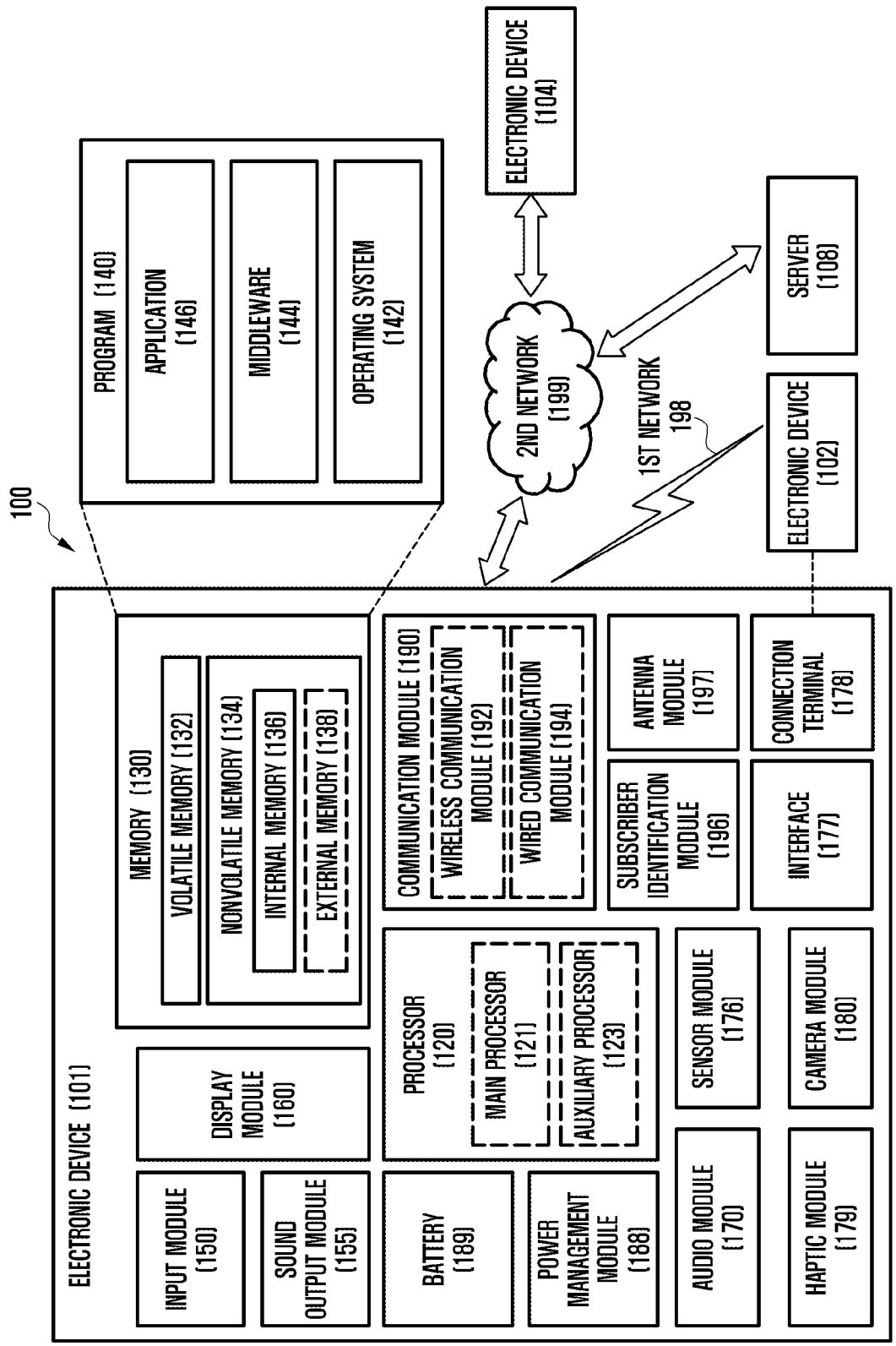
FIG. 1 is a block diagram illustrating an electronic device in a network environment according to various example embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various example embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Figure 2A:
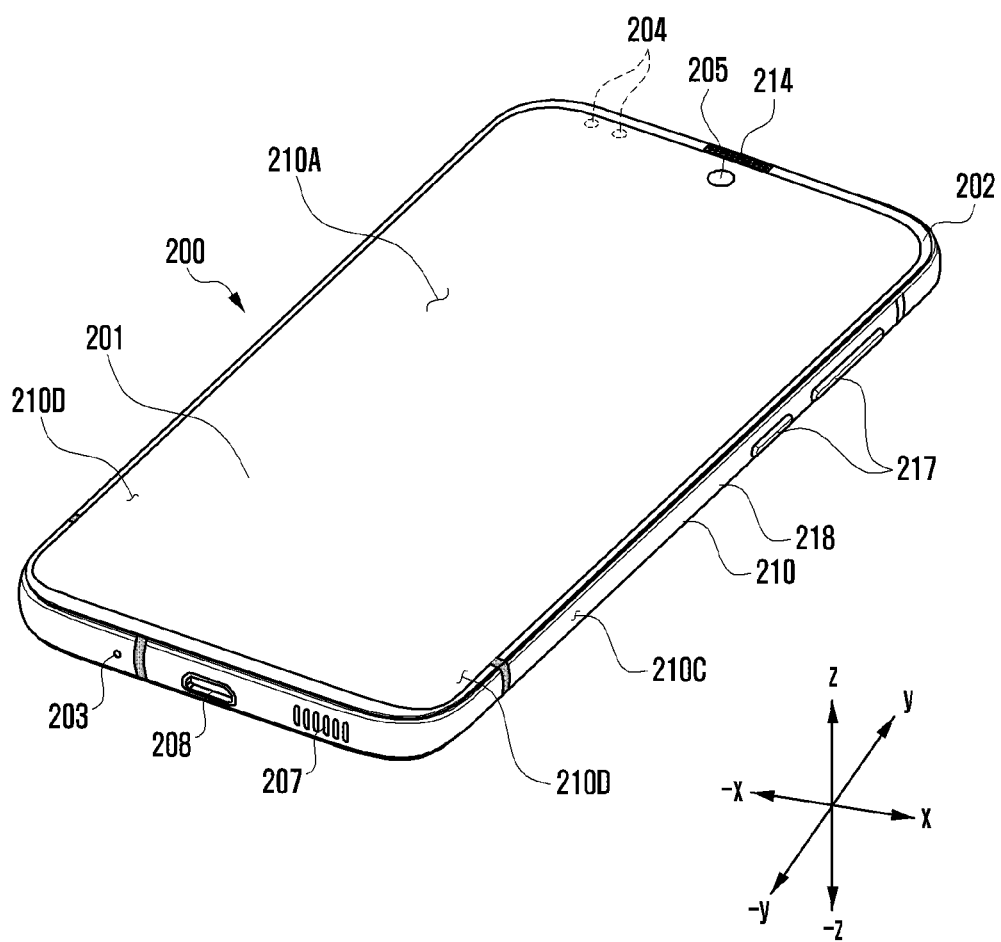
FIG. 2A is a perspective view illustrating a front surface of an electronic device according to various example embodiments.
Figure 2B:
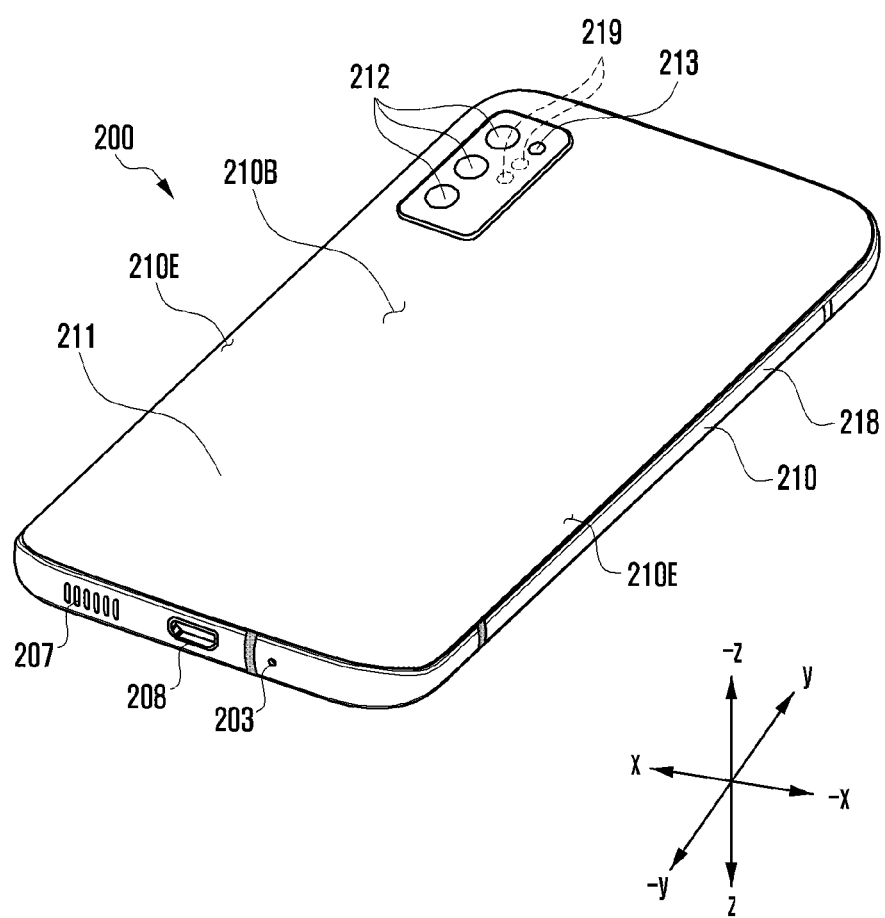
FIG. 2B is a perspective view illustrating a rear surface of an electronic device according to various example embodiments.

FIG. 2A is a front perspective view of an electronic device according to various example embodiments. FIG. 2B is a rear perspective view of the electronic device according to various example embodiments.

Referring to FIG. 2A and FIG. 2B, an electronic device 200 according to an embodiment may include a housing 210 including a first surface (or front surface) 210A, a second surface (or rear surface) 210B, and a side surface 210C surrounding the space between the first surface 210A and the second surface 210B. In another embodiment (not illustrated), the housing may denote a structure that forms a part of the first surface 210A, the second surface 210B, and the side surface 210C illustrated in FIG. 2A and FIG. 2B. According to an embodiment, the first surface 210A may be formed by a front plate 202, at least a part of which is substantially transparent (for example, a glass plate including various coating layers, or a polymer plate). The second surface 210B may be formed by a rear plate 211 that is substantially opaque. The rear plate 211 may be made of coated or colored glass, ceramic, polymer, metal (for example, aluminum, stainless steel (STS), or magnesium), or a combination of at least two of the above-mentioned materials. The side surface 210C may be formed by a side bezel structure (or "side member") 218 which is coupled to the front plate 202 and to the rear plate 211, and which includes metal and/or polymer. In some embodiments, the rear plate 211 and the side bezel structure 218 may be formed integrally and may include the same material (for example, a metal material such as aluminum).

In the illustrated embodiment, the front plate 202 may include two first areas 210D on both ends of the long edge of the front plate 202 such that the two first areas 210D bend from the first surface 210A toward the rear plate 211 and extend seamlessly. In the illustrated embodiment (see FIG. 2B), the rear plate 211 may include two second areas 210E on both ends of the long edge such that the two second areas 210E bend from the second surface 210B toward the front plate 202 and extend seamlessly. In some embodiments, the front plate 202 (or the rear plate 211) may include only one of the first areas 210D (or the second areas 210E). In another embodiment, a part of the first areas 210D or the second areas 210E may not be included. In the above embodiments, when seen from the side surface of the electronic device 200, the side bezel structure 218 may have a first thickness (or width) on a part of the side surface, which does not include the first areas 210D or the second areas 210E as described above, and may have a second thickness that is smaller than the first thickness on a part of the side surface, which includes the first areas 210D or the second areas 210E.

According to an embodiment, the electronic device 200 may include at least one of a display 201, audio modules 203, 207, and 214, sensor modules 204 and 219, camera modules 205, 212, and 213, a key input device 217, indicator, and connector holes 208 and 209. In some embodiments, at least one of the constituent elements (for example, the key input device 217 or indicator) of the electronic device 200 may be omitted, or the electronic device 200 may additionally include another constituent element.

The display 201 may be exposed through a corresponding part of the front plate 202, for example. In some embodiments, at least a part of the display 201 may be exposed through the front plate 202 that forms the first areas 210D of the side surface 210C and the first surface 210A. In some embodiments, the display 201 may have a corner formed in substantially the same shape as that of the adjacent outer periphery of the front plate 202. In another embodiment (not illustrated), in order to increase the area of exposure of the display 201, the interval between the outer periphery of the display 201 and the outer periphery of the front plate 202 may be formed to be substantially identical.

The audio modules may include a microphone hole 203 and speaker holes 207 and 214. A microphone for acquiring an external sound may be arranged in the microphone hole 203, and a plurality of microphones may be arranged therein such that the direction of a sound can be sensed in some embodiments. The speaker holes 207 and 214 may include an outer speaker hole 207 and a speech receiver hole 214. In some embodiments, the speaker holes 207 and 214 and the microphone hole 203 may be implemented as a single hole, or a speaker may be included (for example, a piezoelectric speaker) without the speaker holes 207 and 214.

The sensor modules 204 and 219 may generate an electric signal or a data value corresponding to the internal operating condition of the electronic device 200 or the external environment condition thereof. The sensor modules 204 and 219 may include, for example, a first sensor module 204 (for example, a proximity sensor) arranged on the first surface 210A of the housing 210, and/or a second sensor module (not illustrated) (for example, a fingerprint sensor), and/or a third sensor module 219 (for example, an HRM sensor) arranged on the second surface 210B of the housing 210, and/or a fourth sensor module (for example, a fingerprint sensor). The fingerprint sensor may be arranged not only on the first surface 210A (for example, the display 201) of the housing 210, but also on the second surface 210B thereof. The electronic device 200 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor 204.

The camera modules 205, 212, and 213 may include a first camera device 205 arranged on the first surface 210A of the electronic device 200, a second camera device 212 arranged on the second surface 210B thereof, and/or a flash 213. The camera devices 205 and 212 may include a single lens or a plurality of lenses, an image sensor, and/or an image signal processor. The flash 213 may include, for example, a light-emitting diode or a xenon lamp. In some embodiments, two or more lenses (an infrared camera, a wide-angle lens, and a telephoto lens) and image sensors may be arranged on a single surface of the electronic device 200.

The key input device 217 may be arranged on the side surface 210C of the housing 210. In another embodiment, the electronic device 200 may not include a part of the above-mentioned key input device 217 or the entire key input device 217, and the key input device 217 (not included) may be implemented in another type, such as a soft key, on the display 201. In some embodiments, the key input device may include a sensor module 216 arranged on the second surface 210B of the housing 210.

The indicator may be arranged on the first surface 210A of the housing 210, for example. The indicator may provide information regarding the condition of the electronic device 200 in a light type, for example. In another embodiment, the indicator may provide a light source that interworks with operation of the camera module 205, for example. The indicator may include, for example, an LED, an IR LED, and a xenon lamp.

The connector holes 208 and 209 may include a first connector hole 208 capable of containing a connector (for example, a USB connector) for transmitting/receiving power and/or data to/from an external electronic device, and/or a second connector hole (for example, an earphone jack) 209 capable of containing a connector for transmitting/receiving an audio signal to/from the external electronic device.

In another embodiment (not illustrated), a recess or an opening may be formed in a part of the screen display area of the display 201, and at least one of an audio module 214, a sensor module 204, a camera module 205, and a light-emitting element 206 may be included and aligned with the recess or the opening. In another embodiment (not illustrated), on the back surface of the screen display area of the display 201, at least one of an audio module 214, a sensor module 204, a camera module 205, a fingerprint sensor 216, and a light-emitting element 206 may be included. In another embodiment (not illustrated), the display 201 may be coupled to or arranged adjacent to a touch sensing circuit, a pressure sensor capable of measuring the intensity (pressure) of a touch, and/or a digitizer that detects a magnetic field-type stylus pen. In some embodiments, at least a part of the sensor modules 204 and 219 and/or at least a part of the key input device 217 may be arranged in the first areas 210D and/or the second areas 210E.

Figure 3:
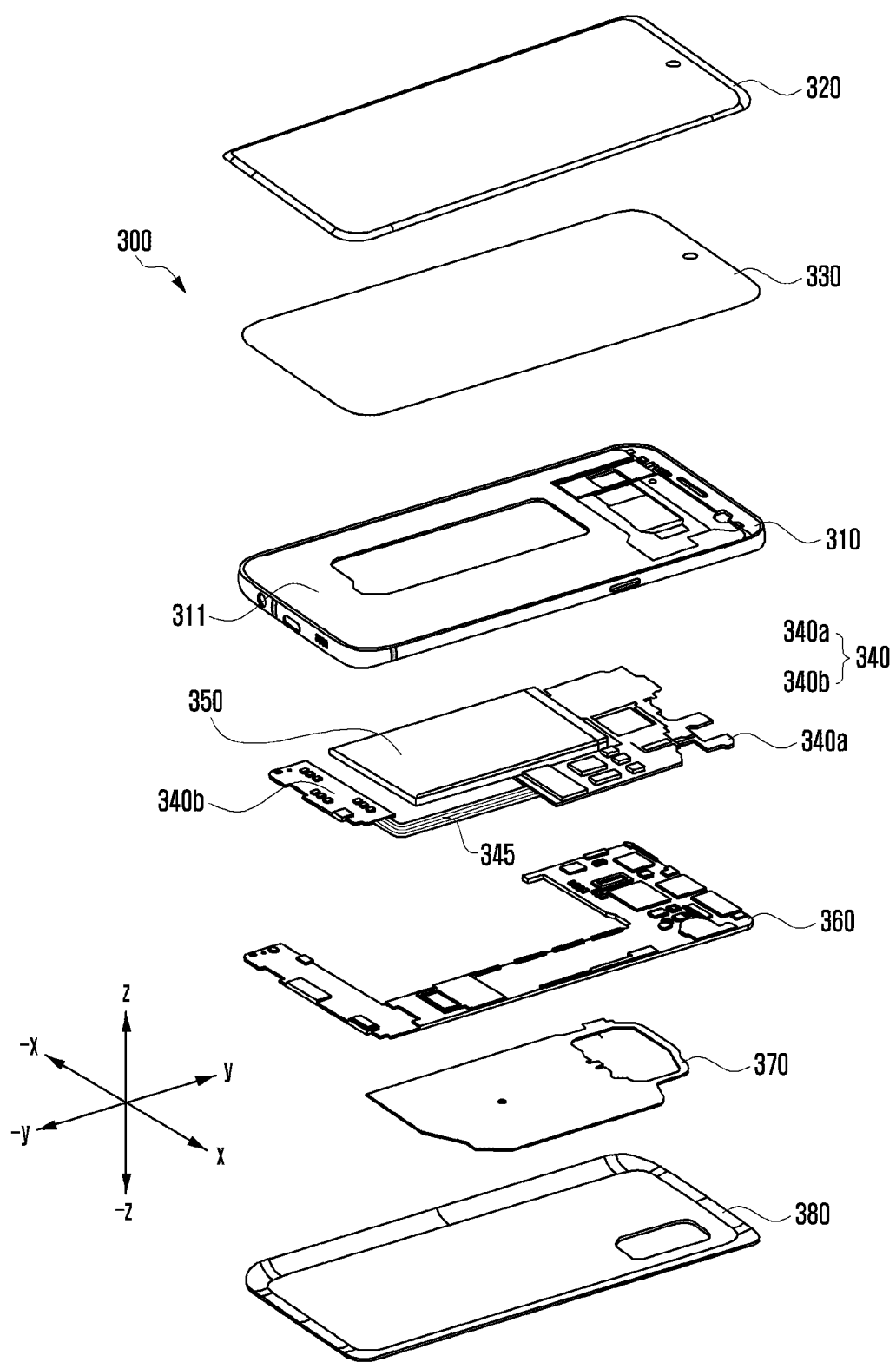
FIG. 3 is an exploded perspective view of an electronic device according to various example embodiments.

FIG. 3 is an exploded perspective view of the electronic device according to various example embodiments.

Referring to FIG. 3, the electronic device 300 may include a side bezel structure 310, a first support member 311 (for example, a bracket), a front plate 320, a display 330, a printed circuit board 340, a battery 350, a second support member 360 (for example, a rear case), an antenna 370, and a rear plate 380. In some embodiments, at least one of the constituent elements (for example, the first support member 311 or the second support member 360) of the electronic device 300 may be omitted, or the electronic device 300 may further include another constituent element. At least one of the constituent elements of the electronic device 300 may be identical or similar to at least one of the constituent elements of the electronic device 101 or 200 of FIG. 1 to FIG. 2B, and repeated descriptions thereof will be omitted herein.

The first support member 311 may be arranged inside the electronic device 300 and connected to the side bezel structure 310, or may be formed integrally with the side bezel structure 310. The first support member 311 may be made of a metal material and/or a nonmetal (for example, polymer) material, for example. The display 330 may be coupled to one surface of the first support member 311, and the printed circuit board 340 may be coupled to the other surface thereof.

A processor, a memory, and/or an interface may be mounted on the printed circuit board 340. The processor may include, for example, one or more of a central processing device, an application processor, a graphic processing device, an image signal processor, a sensor hub processor, or a communication processor.

According to various embodiments, the printed circuit board (PCB) 340 may include a first PCB 340a and/or a second PCB 340b. For example, the first PCB 340a and the second PCB 340b may be disposed to be spaced apart from each other and electrically connected using a connection member 345 (e.g., a coaxial cable and/or FPCB). In another example, the PCB 340 may include a structure in which a plurality of PCBs are stacked. The PCB 340 may include an interposer structure. The PCB 340 may be implemented in the form of a flexible PCB (FPCB) and/or a rigid PCB. In an embodiment, the side member 310 (e.g., the housing) may include at least one segmenting portion (e.g., a slit).

The memory may include a volatile memory or a non-volatile memory, for example.

The interface may include, for example, a high definition multimedia interface (HDMI), a universal serial bus (USB) interface, an SD card interface, and/or an audio interface. The interface may connect the electronic device 300 with an external electronic device electrically or physically, for example, and may include a USB connector, an SD card/MMC connector, or an audio connector.

The battery 350 is a device for supplying power to at least one constituent element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example. In another embodiment, an antenna structure may be formed by a part or a combination of the side bezel structure 310 and/or the first support member 311.

Figure 4A:
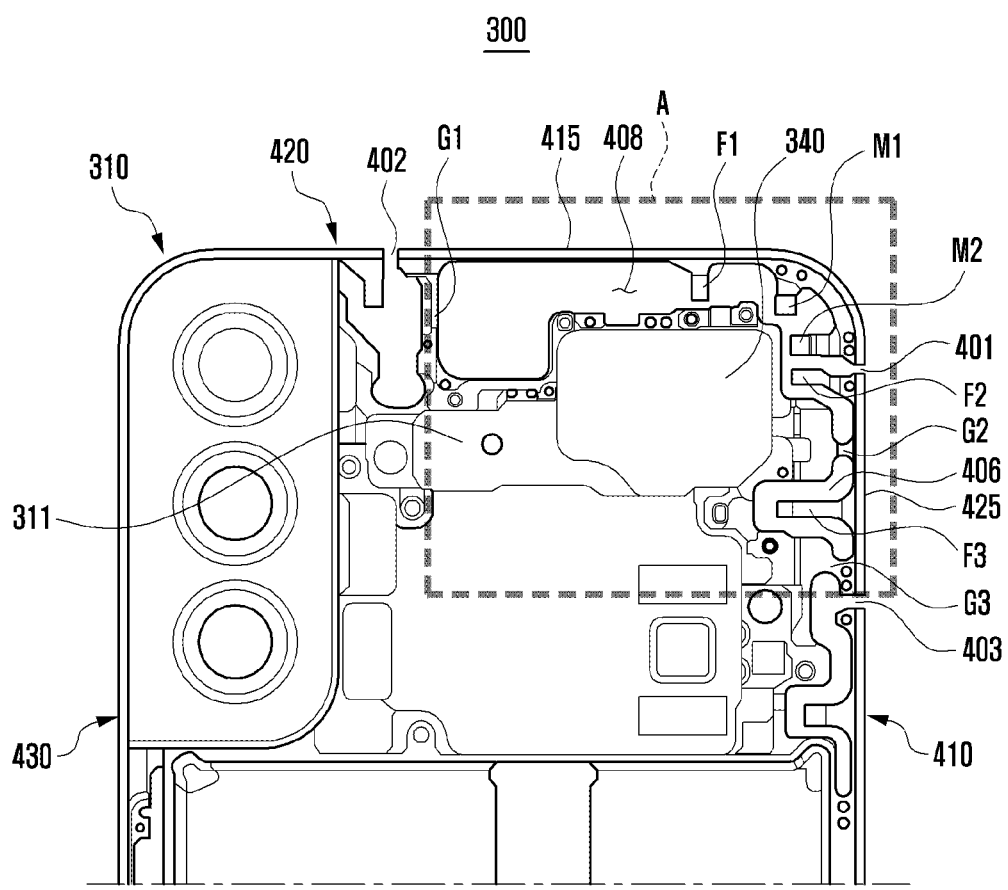
FIG. 4A is a diagram schematically illustrating a part of an electronic device including at least one segmenting portion according to various example embodiments.
Figure 4B:
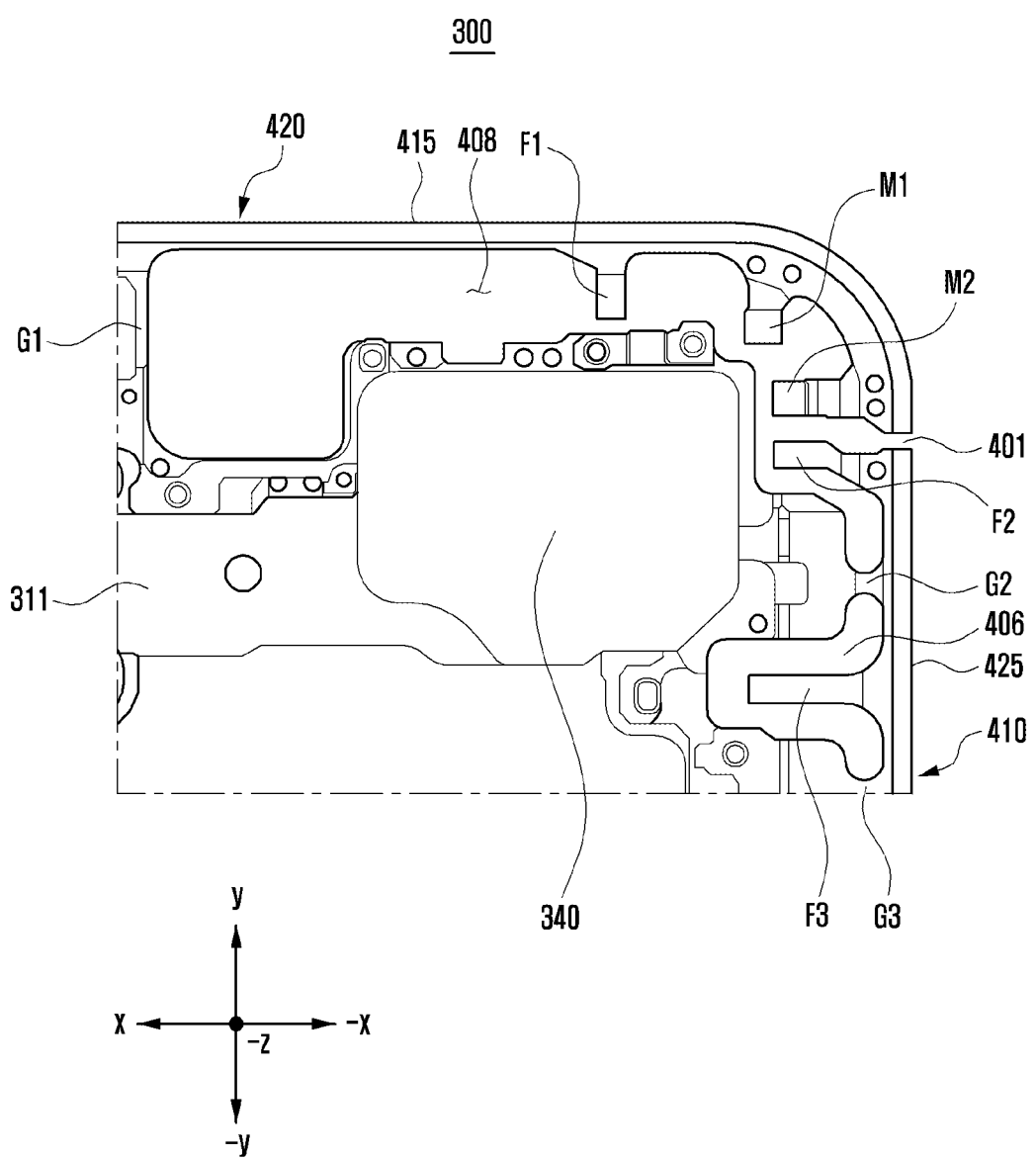
FIG. 4B is a schematic enlarged view of the part A shown in FIG. 4A according to various example embodiments.
Figure 4C:
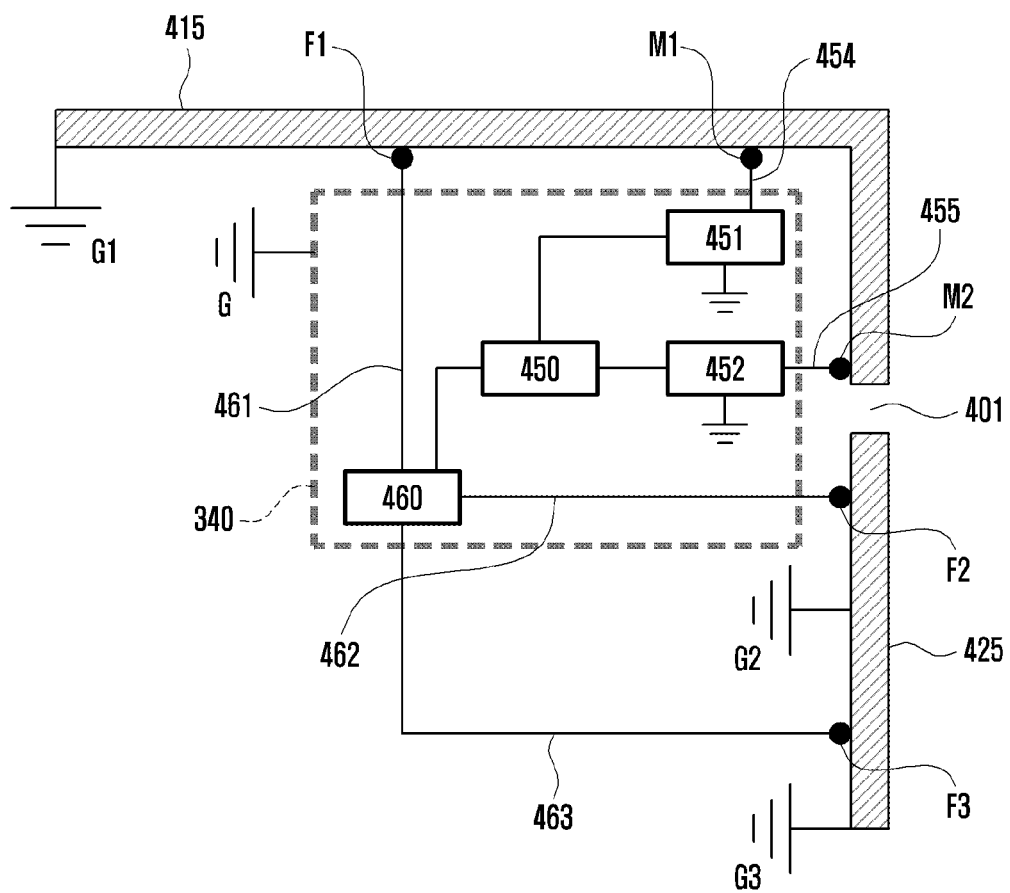
FIG. 4C is a diagram schematically illustrating the circuit configuration of the first conductive portion and the second conductive portion of FIGS. 4A and 4B.

FIG. 4A is a diagram schematically illustrating a part of an electronic device including at least one segmenting portion according to various example embodiments. FIG. 4B is a schematic enlarged view of the part A shown in FIG. 4A according to various example embodiments. FIG. 4C is a diagram schematically illustrating the circuit configuration of the first conductive portion and the second conductive portion of FIGS. 4A and 4B.

In an embodiment, FIG. 4A is a diagram, viewed from the negative z-axis direction, of a part (e.g., in the y-axis direction) of a state in which the PCB 340 (e.g., the second PCB 340a) is disposed on one surface (e.g., in the negative z-axis direction) of the support member 311 (e.g., the first support member 311) disposed in the housing 310 (e.g., the side member) shown in FIG. 3 according to various example embodiments.

According to various embodiments, the electronic device 300 disclosed below may include the embodiments of the electronic devices 101 and 200 illustrated in FIGS. 1 to 3. In the description of the electronic device 300 disclosed below, the same reference numbers may be assigned to the components substantially the same as those of the embodiments illustrated in FIGS. 1 to 3, and duplicate descriptions of their functions may be omitted.

According to an embodiment, although the embodiment related to the electronic device 300 disclosed below will be described with respect to a bar-type electronic device, which is not a limitation. The following description may also be applied to any electronic device such as a foldable type, a rollable type, a sliding type, a wearable type, a tablet PC, and/or a notebook PC.

With reference to FIGS. 4A to 4C, the housing 310 of the electronic device 300 according to an example embodiment may have a first side surface 410, a second side surface 420, and a third side surface 430. The first side surface 410 may extend in the lower direction (e.g., in the negative y-axis direction) from a first part (e.g., in the negative x-axis direction) of the second side surface 420 disposed in the upper direction (e.g., in the y-axis direction) of the electronic device 300, and the third side surface 430 may extend in the lower direction (e.g., in the negative y-axis direction) from a second part (e.g., in the x-axis direction) of the second side surface 420.

According to an embodiment, the housing 310 may include a support member 311 (e.g., the first support member 311 in FIG. 3) disposed therein. The support member 311 may be connected, directly or indirectly, to the housing 310 or integrally formed inside the housing 310. For example, the support member 311 may be connected, directly or indirectly, to a part of the first side surface 410, a part of the second side surface 420, and a part of the third side surface 430. Between a part of the first side surface 410 and the support member 311, a first opening 406 and a part of a second opening 408 may be formed. Between a part of the second side surface 420 and the support member 311, the second opening 408 may be formed.

According to an embodiment, the first side surface 410 may have a first segmenting portion 401 (e.g., a slit) and/or a third segmenting portion 403. The first segmenting portion 401 may be formed closer to the first part (e.g., in the negative x-axis direction) of the second side surface than the third segmenting portion 403. The second side surface 420 may have a second segmenting portion 402. Between the first segmenting portion 401 and the second segmenting portion 402, a first conductive portion 415 (e.g., a first radiator) may be disposed. For example, the first conductive portion 415 may have an "¬" shape between the first segmenting portion 401 formed in the first side surface 410 and the second segmenting portion 402 formed in the second side surface 420.

According to an embodiment, the first conductive portion 415 may have inwardly a first ground portion G1, a first feeding point F1, a first point M1 and/or a second point M2. For example, the first ground portion G1 may be a portion that protrudes from the inner side of the first conductive portion 415 in a lower direction (e.g., the negative y-axis direction) and is electrically connected to a part of the support member 311. The first feeding point F1 and the first point M1 may be portions protruding from the inner side of the first conductive portion 415 toward the second opening 408 in a lower direction (e.g., in the negative y-axis direction). The second point M2 may be a portion protruding from the inner side of the first conductive portion 415 toward the second opening 408 in one direction (e.g., the x-axis direction).

According to an embodiment, the first ground portion G1 may be disposed adjacent to the second segmenting portion 402. For example, the first ground portion G1 may be disposed adjacent to an end, in the x-axis direction, of the first conductive portion 415 adjacent to the second segmenting portion 402. In another example, the first ground portion G1 may be positioned between the second segmenting portion 402 and the first feeding point F1. The second point M2 may be disposed adjacent to the first segmenting portion 401. For example, the second point M2 may be disposed adjacent to an end, in the negative x-axis direction and the negative y-axis direction, of the first conductive portion 415 adjacent to the first segmenting portion 401. In still another example, the second point M2 may be positioned between the first segmenting portion 401 and the first point M1. Between the first ground portion G1 and the second point M2, the first feeding point F1 and the first point M1 may be disposed. For example, the first feeding point F1 may be disposed between the first ground portion G1 and the first point M1. The first point M1 may be disposed between the first feeding point F1 and the second point M2.

According to an embodiment, the first ground portion G1 may be connected to a part of the support member 311. The first ground portion G1 may be electrically connected to the ground G formed on the PCB 340 using a part of the support member 311. The first ground portion G1 may ground the first conductive portion 415.

According to an embodiment, the first feeding point F1 may be electrically connected to a wireless communication circuit 460 (e.g., the wireless communication module 192 in FIG. 1, comprising communication circuitry) disposed on the PCB 340 through a first signal path 461, such as in FIG. 4C. The first conductive portion 415 (e.g., a first radiator) may be electrically connected to the wireless communication circuit 460 through the first feeding point F1, thus operating as an antenna.

According to an embodiment, the first point M1 may be electrically connected to a first matching circuit 451 disposed on the PCB 340 through a fourth signal path 454. The second point M2 may be electrically connected to a second matching circuit 452 disposed on the PCB 340 through a fifth signal path 455.

According to an embodiment, the first matching circuit 451 and/or the second matching circuit 452 may be electrically connected to and controlled by a processor 450 disposed on the PCB 340. Each "processor" herein comprises processing circuitry.

According to an embodiment, between the first segmenting portion 401 and the third segmenting portion 403 formed on the first side surface 410, a second conductive portion 425 (e.g., a second radiator) may be disposed.

According to an embodiment, the second conductive portion 425 may have inwardly a second feeding point F2, a second ground portion G2, a third feeding point F3, and/or a third ground portion G3. For example, the second feeding point F2 may be a portion protruding from the inner side of the first side surface 410 toward the second opening 408 in the x-axis direction. The second ground portion G2 may be a portion that protrudes from the inner side of the first side surface 410 in the x-axis direction and is electrically connected to a part of the support member 311. The third feeding point F3 may be a portion protruding from the inner side of the first side surface 410 toward the first opening 406 in the x-axis direction. The third feeding point F3 is formed to be surrounded by the first opening 406 and may be formed between the second feeding part G2 and the third feeding part G3. The third ground portion G3 may be a portion that protrudes from the inner side of the first side surface 410 in the x-axis direction and is electrically connected to a part of the support member 311.

According to an embodiment, the second feeding point F2 may be disposed adjacent to the first segmenting portion 401 in the second opening 408. For example, the second feeding point F2 may be disposed adjacent to an end, in the y-axis direction, of the second conductive portion 425 adjacent to the first segmenting portion 401. In another example, the second feeding point F2 may be positioned between the first segmenting portion 401 and the second ground portion G2. The third ground portion G3 may be disposed adjacent to the third segmenting portion 403. For example, the third ground portion G3 may be disposed adjacent to an end, in the negative y-axis direction, of the second conductive portion 425 adjacent to the third segmenting portion 403. In still another example, the third ground portion G3 may be positioned between the third segmenting portion 403 and the third feeding point F3. Between the second feeding point F2 and the third ground portion G3, the second ground portion G2 and the third feeding point F3 may be disposed. The second ground portion G2 may be disposed between the second feeding point F2 and the third feeding point F3. The third feeding point F3 may be disposed between the second ground portion G2 and the third ground portion G3.

According to an embodiment, the second feeding point F2 may be electrically connected to the wireless communication circuit 460 disposed on the PCB 340 through a second signal path 462. A part of the second conductive portion 425 (e.g., a second radiator) may be electrically connected to the wireless communication circuit 460 through the second feeding point F2, thus operating as a second antenna.

According to an embodiment, the second ground portion G2 may be connected to a part of the support member 311. The second ground portion G2 may be electrically connected to the ground G formed on the PCB 340 through a part of the support member 311. The second ground portion G2 may ground a part (e.g., a first part) of the second conductive portion 425.

According to an embodiment, the third feeding point F3 may be electrically connected to the wireless communication circuit 460 disposed on the PCB 340 through a third signal path 463. At least a part of the second conductive portion 425 (e.g., a second radiator) may be electrically connected to the wireless communication circuit 460 through the third feeding point F3, thus operating as a third antenna.

According to an embodiment, the third ground portion G3 may be connected, directly or indirectly, to a part of the support member 311. The third ground portion G3 may be electrically connected to the ground G formed on the PCB 340 through a part of the support member 311. The third ground portion G3 may ground another part (e.g., a second part) of the second conductive portion 425.

In an embodiment, FIG. 4C is a diagram schematically illustrating an electrical connection relationship of the first conductive portion 415 and the second conductive portion 425, shown in FIGS. 4A and 4B, with respect to the processor 450 and the wireless communication circuit 460, disposed on the PCB 340.

With reference to FIG. 4C, the PCB 340 may include the processor 450 (comprising processing circuitry), the wireless communication circuit 460, the first matching circuit 451, the second matching circuit 452, and/or the ground G.

According to an embodiment, the processor 450 (e.g., the processor 120 in FIG. 1) may be electrically connected to the wireless communication circuit 460, the first matching circuit 451, and/or the second matching circuit 452. In an embodiment, the processor 450 may control the wireless communication circuit 460, the first matching circuit 451, and/or the second matching circuit 452. The processor 450 may control the wireless communication circuit 460 and thereby transmit a feeding signal to at least one of the first feeding point F1, the second feeding point F2, and the third feeding point F3. The processor 450 may control the first matching circuit 451 and/or the second matching circuit 452 and thereby control an electrical length or path of an antenna (e.g., the first to third antennas) including at least a part of the first conductive portion 415 and/or the second conductive portion 425. The processor 450 may control on/off signals of the first matching circuit 451 and/or the second matching circuit 452 and may adjust and change the frequency band and resonant frequency of the first to third antennas using the first conductive portion 415 and the second conductive portion 425. The processor 450 may include, for example, a communication processor, a radio frequency IC (RFIC), and/or a wireless communication module comprising communication circuitry (e.g., the wireless communication module 192 in FIG. 1). Each "module" herein may comprise circuitry.

According to an embodiment, the wireless communication circuit 460 may be electrically connected to the first feeding point F1, the second feeding point F2, and/or the third feeding point F3. For example, the wireless communication circuit 460 may be electrically connected to the first feeding point F1 through the first signal path 461. The wireless communication circuit 460 may be electrically connected to the second feeding point F2 through the second signal path 462. The wireless communication circuit 460 may be electrically connected to the third feeding point F3 through the third signal path 463. According to various embodiments, the wireless communication circuit 460 included may be at least one or more. For example, a plurality of wireless communication circuits 460 may be included and, depending on situations, electrically connected to the first feeding point F1, the second feeding point F2, and the third feeding point F3. In various embodiments, by using, for example, a contact pad, a coupling member, a C-clip, or a conductive foam spring, the wireless communication circuit 460 may be electrically connected to the first feeding point F1, the second feed point F2, and/or the third feeding point F3. The wireless communication circuit 460 may be electrically connected to the processor 450. The wireless communication circuit 460 may transmit a feeding signal to the first feeding point F1, the second feeding point F2, and/or the third feeding point F3. The wireless communication circuit 460 may support the first conductive portion 415 and/or the second conductive portion 425 to transmit and/or receive radio signals.

According to an embodiment, the first matching circuit 451 and/or the second matching circuit 452 may be electrically connected to the processor 450. In another embodiment, the first matching circuit 451 and the second matching circuit 452 may be electrically connected to the wireless communication circuit 460. The first matching circuit 451 may be electrically connected to the first point M1 through the fourth signal path 454. The second matching circuit 452 may be electrically connected to the second point M2 through the fifth signal path 455. The first matching circuit 451 and the second matching circuit 452 may include at least one switch or at least one lumped element. The at least one lumped element may include, for example, an inductor or a capacitor. The first matching circuit 451 and the second matching circuit 452 may perform an on/off operation under the control of the processor 450 or the wireless communication circuit 460. As a matching value is adjusted under the control of the processor 450 or the wireless communication circuit 460, the first matching circuit 451 and/or the second matching circuit 452 may adjust the electrical length or path of the antenna (e.g., the first to third antennas) including at least a part of the first conductive portion 415 and/or the second conductive portion 425. For example, the first matching circuit 451 and/or the second matching circuit 452 may improve the radiation performance of the antenna including at least a part of the first conductive portion 415 and/or the second conductive portion 425. The first matching circuit 451 and the second matching circuit 452 may electrically connect or disconnect the first point M1 or the second point M2 to or from the ground G under the control of the processor 450 or the wireless communication circuit 460. The first matching circuit 451 and the second matching circuit 452 may be electrically connected to the ground G formed on the PCB 340. In an embodiment, the first matching circuit 451 may include at least one inductor. In an embodiment, the second matching circuit 452 may include at least one capacitor. In another embodiment, the first matching circuit 451 may include at least one capacitor, and the second matching circuit 452 may include at least one inductor.

According to an embodiment, the ground G formed on the PCB 340 may be connected to at least one of first ground portion G1 disposed on the first conductive portion 415 and the second ground portion G2 and the third ground portion G3 disposed on the second conductive portion 425.

Figure 5:
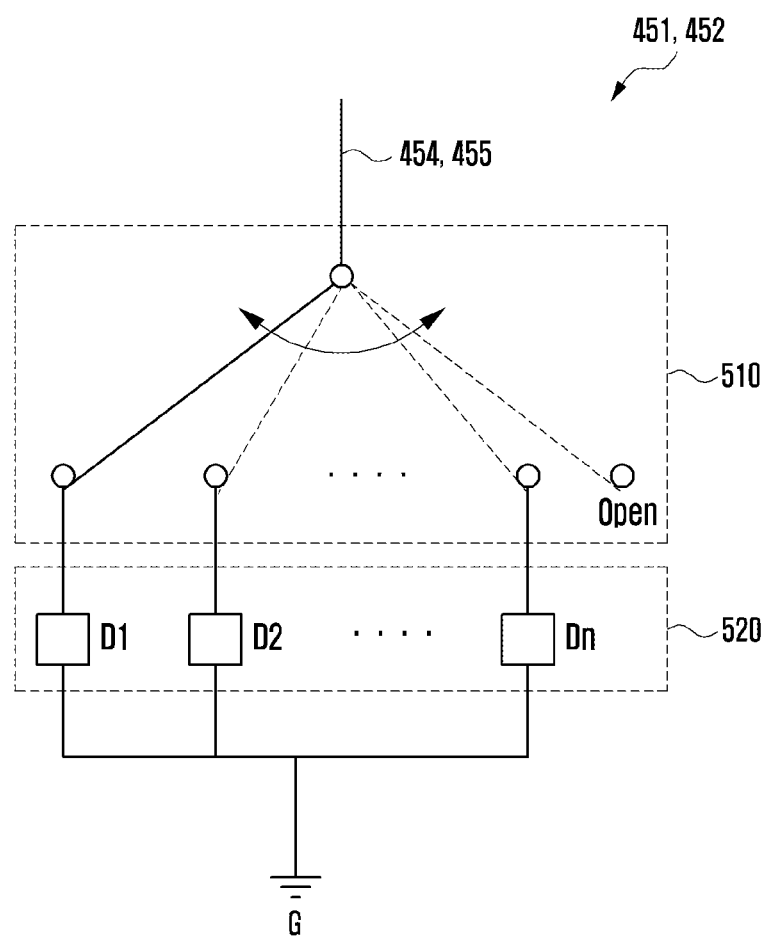
FIG. 5 is a diagram schematically illustrating the configurations of the first matching circuit and the second matching circuit shown in FIG. 4C according to various example embodiments.

FIG. 5 is a diagram schematically illustrating the configurations of the first matching circuit and the second matching circuit shown in FIG. 4C according to various example embodiments.

With reference to FIG. 5, each of the first matching circuit 451 or the second matching circuit 452 of the electronic device 300 according to various example embodiments may include at least one switch 510 and at least one passive element 520 (D1, D2, Dn, open) electrically connected to or disconnected from a signal path (e.g., the fourth signal path 454 and/or the fifth signal path 455) by the at least one switch 510. The at least one passive element 520 may have different element values. The at least one passive element 520 (e.g., a lumped element) may include a capacitor having various capacitance values and/or an inductor having various inductance values. The at least one switch 510 may selectively connect an element having a specified element value (e.g., a matching value) to the fourth signal path 454 and/or the fifth signal path 455 under the control of the processor 450. In an embodiment, the at least one switch 510 may include a micro-electro mechanical systems (MEMS) switch. The MEMS switch performs a mechanical switching operation by an internal metal plate, thus having a complete turn on/off characteristic and not substantially affecting a change in antenna radiation characteristics. In some embodiments, the at least one switch 510 may include a single pole single throw (SPST), a single pole double throw (SPDT), or a switch having three or more throws.

In an embodiment, the first matching circuit 451 and the first point M1 may be electrically connected, directly or indirectly, using the fourth signal path 454, and the second point M2 may be electrically connected to the ground G. In another embodiment, the second matching circuit 452 and the second point M2 may be electrically connected using the fifth signal path 455, and the first point M1 may be electrically connected to the ground G.

Figure 6A:
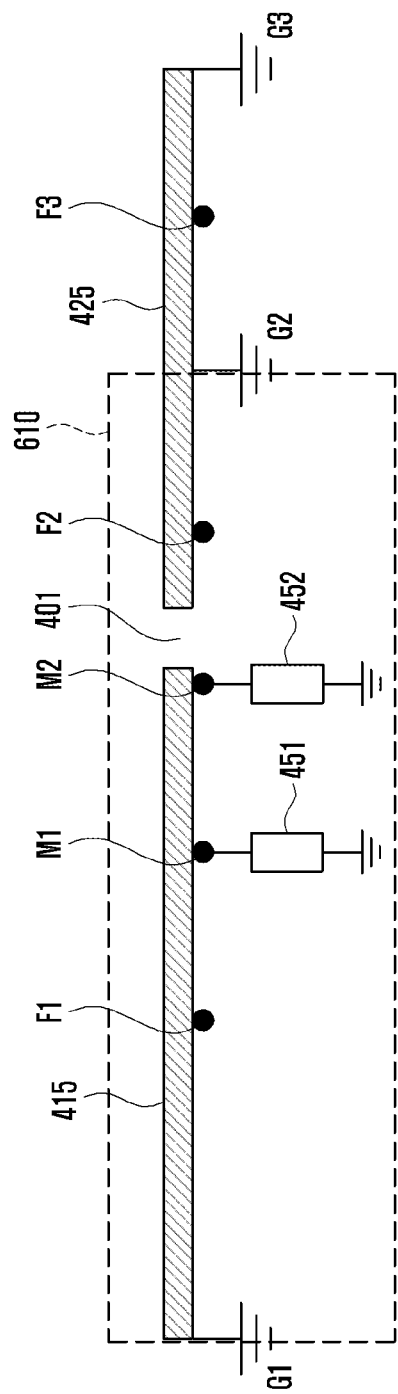
FIG. 6A is a diagram illustrating an operation principle of using, as a first antenna, a first conductive portion and a part of a second conductive portion of an electronic device according to various example embodiments.
Figure 6B:
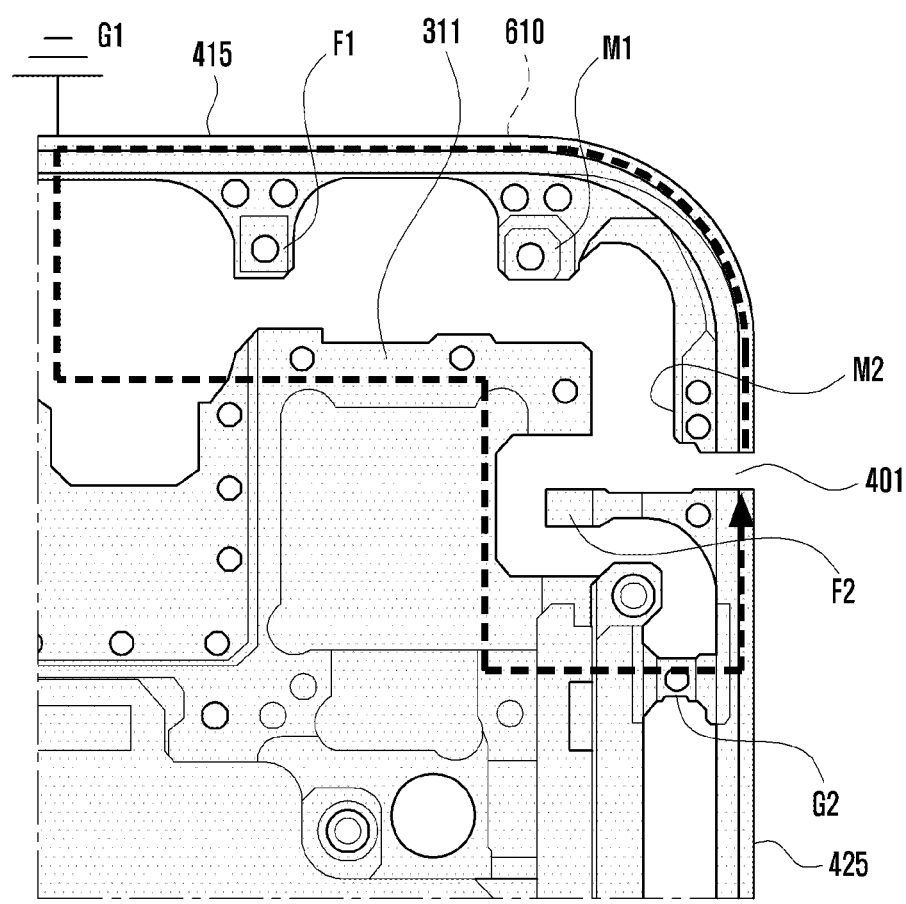
FIG. 6B is a diagram illustrating a flow of current applied to a first conductive portion and a part of a second conductive portion according to various example embodiments.
Figure 6C:
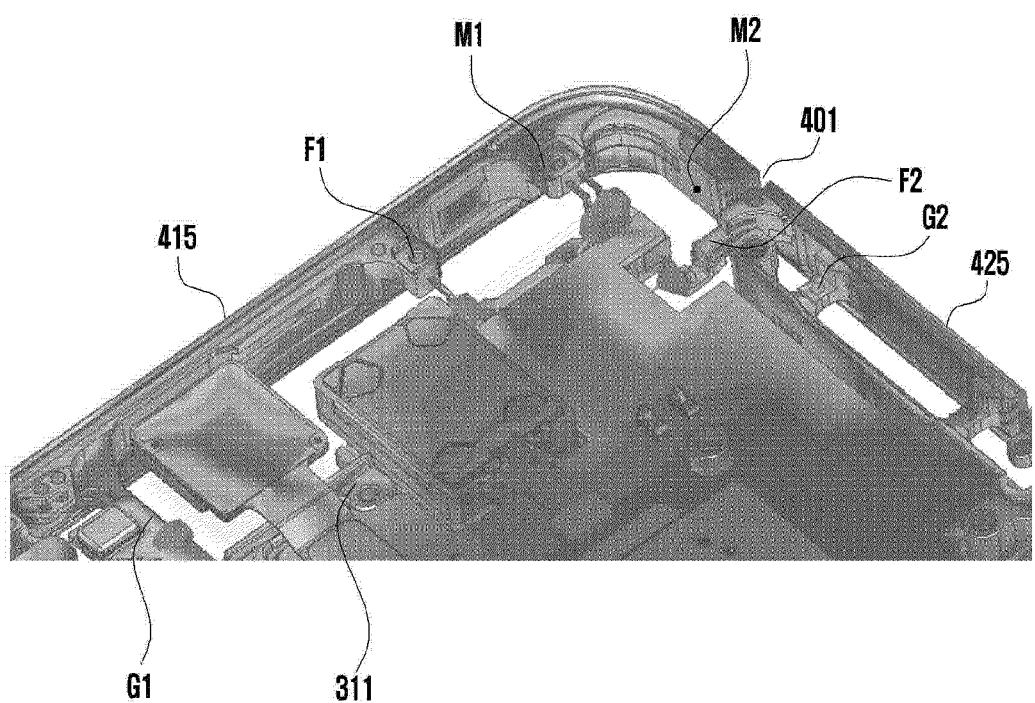
FIG. 6C is a diagram illustrating electric fields for a first conductive portion and a part of a second conductive portion according to various example embodiments.

FIG. 6A is a diagram illustrating an operation principle of using, as a first antenna, a first conductive portion and a part of a second conductive portion of an electronic device according to various example embodiments. FIG. 6B is a diagram illustrating a flow of current applied to a first conductive portion and a part of a second conductive portion according to various example embodiments. FIG. 6C is a diagram illustrating electric fields for a first conductive portion and a part of a second conductive portion according to various example embodiments.

In an embodiment, FIG. 6A is a diagram schematically showing configuration when the first conductive portion 415 and the second conductive portion 425 shown in FIGS. 4A to 4C according to various example embodiments are unfolded in a horizontal direction (e.g., the x-axis and negative x-axis directions).

With reference to FIGS. 6A to 6C, the electronic device 300 according to an example embodiment may use the first conductive portion 415 and a part of the second conductive portion 425 as a radiator of a first antenna 610. The first antenna 610 may operate in a first frequency band. For example, the first antenna 610 may transmit and/or receive a signal of about 600 MHz to 3 GHz.

According to an embodiment, the first antenna 610 may support the first frequency band (e.g., about 600 MHz to 3 GHz) by using the first conductive portion 415 and a part of the second conductive portion 425 under the control of the processor 450 or the wireless communication circuit 460. For example, the first antenna 610 may operate by using as a radiator the entirety of the first conductive portion 415 and a part of the second conductive portion 425 up to a placement point of the second ground portion G2.

With reference to FIGS. 6B and 6C, in the first antenna 610, a current flows from an end (e.g., in the negative y-axis direction, a point of the first conductive portion 415 where the second point M2 is formed) of the first conductive portion 415 adjacent to the first segmenting portion 401 toward an end (e.g., in the y-axis direction, a point of the second conductive portion 425 where the second feeding point F2 is formed) of the second conductive portion 425 adjacent to the first segmenting portion 401 through the first ground portion G1, a part of the support member 311 (e.g., the first support member 311 in FIG. 3), and the second ground portion G2 of the second conductive portion 425, thereby forming an electric field (e.g., current distribution).

According to an embodiment, in the case that the first antenna 610 operates in the first frequency band (e.g., about 600 MHz to 3 GHz) using the first conductive portion 415 and a part of the second conductive portion 425, the first and second matching circuits 451 and 452 may be turned off, or the first matching circuit 451 may be turned on and the second matching circuit 452 may be turned off, under the control of the processor 450. In an embodiment, in the case that the first antenna 610 operates at about 700 MHz to 750 MHz, the first and second matching circuits 451 and 452 may be turned off. In another embodiment, in the case that the first antenna 610 operates at about 800 MHz to 1 GHz, the first matching circuit 451 may be turned on, and the second matching circuit 452 may be turned off.

According to an embodiment, as the first conductive portion 415 and a part of the second conductive portion 425 are used as a radiator, the electrical length of the first antenna 610 may be increased. In various embodiments, when the first antenna 610 operates in a frequency band of about 700 MHz to 750 MHz and/or a frequency band of about 800 MHz to 1 GHz, a second antenna (e.g., the second antenna 720 in FIGS. 7A to 7C) does not operate, and a third antenna (e.g., the third antenna 830 in FIG. 8A) may operate by receiving a feeding signal through the third feeding point F3.

Figure 7A:
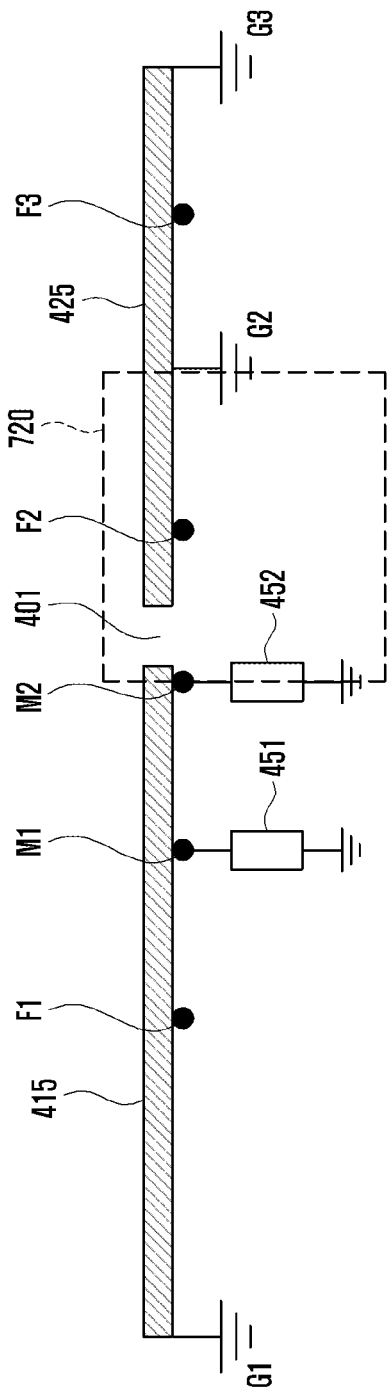
FIG. 7A is a diagram illustrating an operation principle of using, as a second antenna, an end of a first conductive portion and a part of a second conductive portion of an electronic device according to various example embodiments.
Figure 7B:
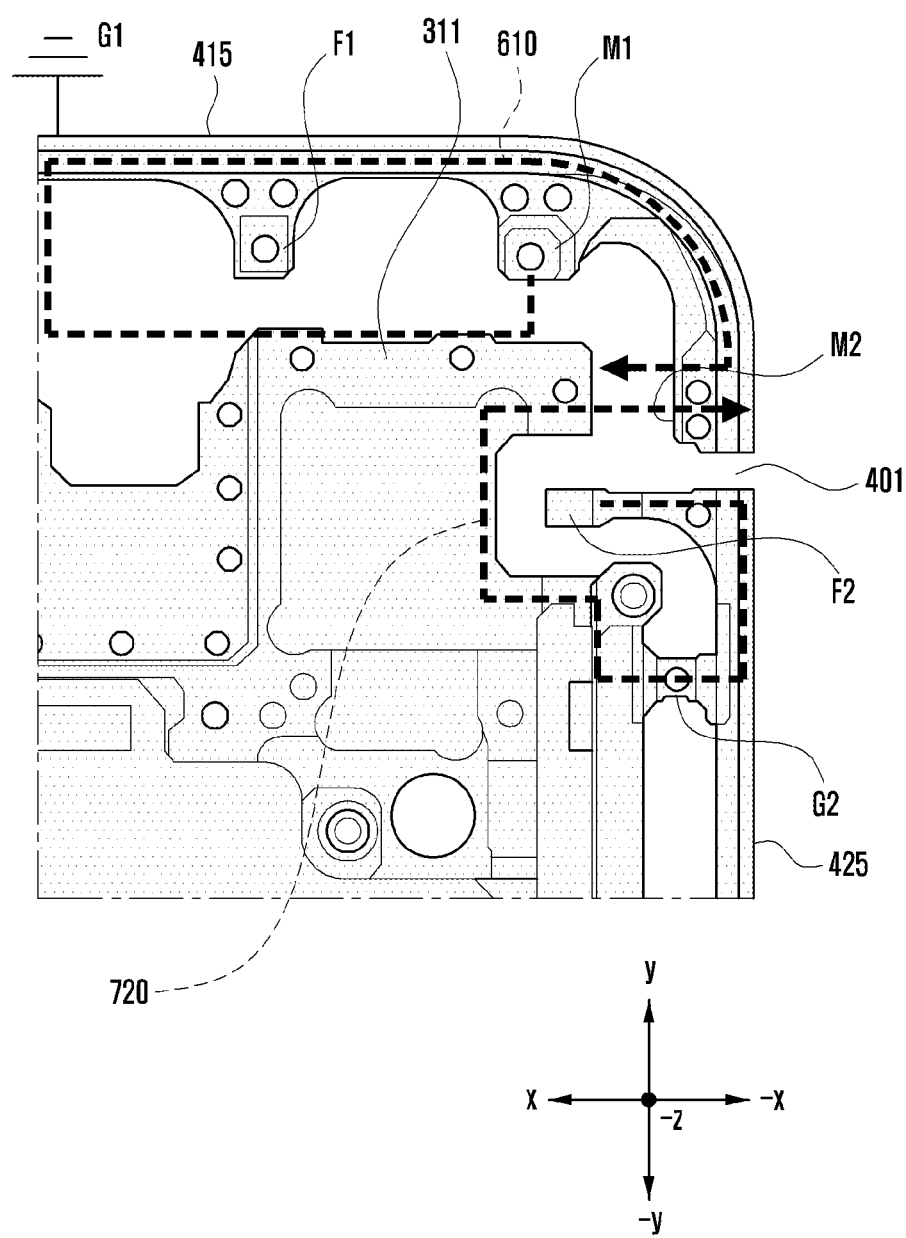
FIG. 7B is a diagram illustrating a flow of current applied to a part of a first conductive portion and a part of a second conductive portion according to various example embodiments.
Figure 7C:
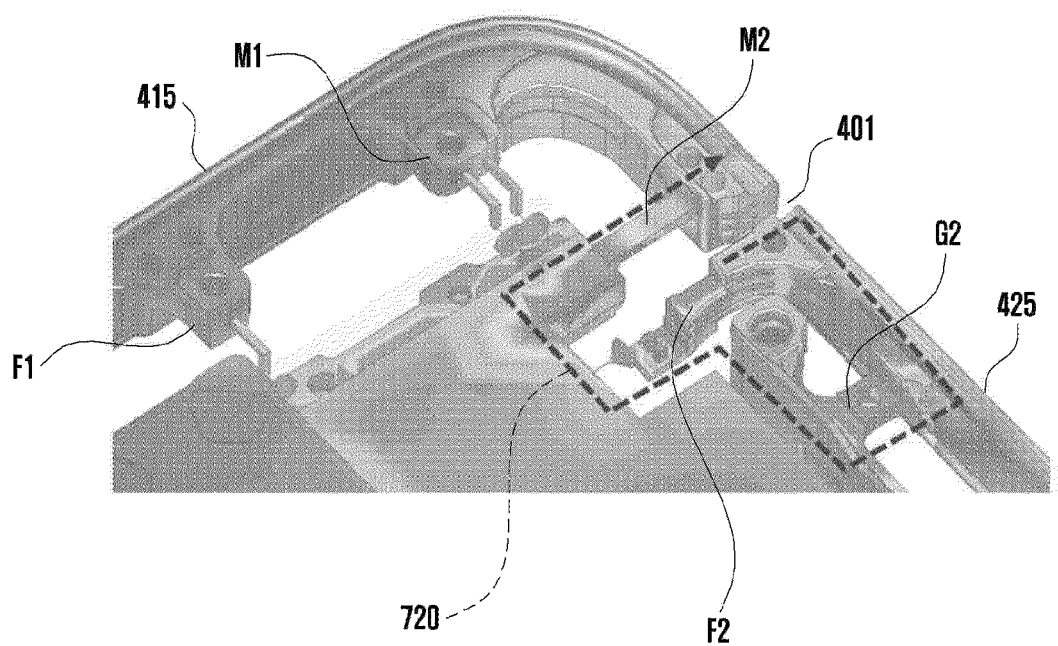
FIG. 7C is a diagram illustrating electric fields for a part of a first conductive portion and a part of a second conductive portion according to various example embodiments.

FIG. 7A is a diagram illustrating an operation principle of using, as a second antenna, an end of a first conductive portion and a part of a second conductive portion of an electronic device according to various example embodiments. FIG. 7B is a diagram illustrating a flow of current applied to a part of a first conductive portion and a part of a second conductive portion according to various example embodiments. FIG. 7C is a diagram illustrating electric fields for a part of a first conductive portion and a part of a second conductive portion according to various example embodiments.

In an embodiment, FIG. 7A is a diagram schematically showing configuration when the first conductive portion 415 and the second conductive portion 425 shown in FIGS. 4A to 4C according to various example embodiments are unfolded in a horizontal direction (e.g., the x-axis and negative x-axis directions).

With reference to FIGS. 7A to 7C, the electronic device 300 according to an example embodiment may use an end (e.g., in the negative y-axis direction, a point of the first conductive portion 415 where the second point M2 is formed) of the first conductive portion 415 and a part of the second conductive portion 425 as a radiator of a second antenna 720. The second antenna 720 may operate in a second frequency band. For example, the second antenna 720 may transmit and/or receive a signal of about 3 GHz to 4.5 GHz.

According to an embodiment, the second antenna 720 may support the second frequency band (e.g., about 3 GHz to 4.5 GHz) by using an end (e.g., in the negative y-axis direction, a point of the first conductive portion 415 where the second point M2 is formed) of the first conductive portion 415 and a part of the second conductive portion 425 under the control of the processor 450 or the wireless communication circuit 460. For example, the second antenna 720 may operate by using as a radiator the end of the first conductive portion 415 and a part of the second conductive portion 425 up to a placement point of the second ground portion G2.

With reference to FIGS. 7B and 7C, in the second antenna 720, a current flows from an end (e.g., in the y-axis direction, a point of the second conductive portion 425 where the second feeding point F2 is formed) of the second conductive portion 425 toward an end (e.g., in the negative y-axis direction, a point of the first conductive portion 415 where the second point M2 is formed) of the first conductive portion 415 adjacent to the first segmenting portion 401 through the second ground portion G2 and a part of the support member 311, thereby forming an electric field (e.g., current distribution).

According to an embodiment, in the case that the second antenna 720 operates in the second frequency band (e.g., about 3 GHz to 4.5 GHz) using a part of the first conductive portion 415 and a part of the second conductive portion 425, the first matching circuit 451 may be turned off and the second matching circuit 452 may be turned on, or the first and second matching circuits 451 and 452 may be turned on, under the control of the processor 450. In an embodiment, in the case that the first matching circuit 451 is turned off and the second matching circuit 452 is turned on, the first antenna 610 may not operate, the second antenna 720 may operate in the second frequency band, and a third antenna (e.g., the third antenna 830 in FIG. 8A) may operate by receiving a feeding signal through the third feeding point F3. In another embodiment, in the case that the first and second matching circuits 451 and 452 are turned on, at least a part of the first conductive portion 415 may be used as the first antenna 610 operating at about 1.5 GHz to 3 GHz, the second antenna 720 may operation in the second frequency band, and the third antenna (e.g., the third antenna 830 in FIG. 8A) may operate by receiving a feeding signal through the third feeding point F3.

According to various embodiments, in the case that the first matching circuit 451 is turned on, the second matching circuit 452 is switched to the on state, the matching value of the first matching circuit 451 and/or the second matching circuit 452 is changed, and thereby at least a part of the first conductive portion 415 is used as the first antenna 610, the first antenna 610 shown in FIG. 7B may be controlled to operate at about 1.5 GHz to 3 GHz, compared to the frequency band of about 700 MHz to 750 MHz shown in FIG. 6B.

According to an embodiment, as a part of the first conductive portion 415 and a part of the second conductive portion 425 share the first segmenting portion 401 and are used as an antenna radiator, it is possible to improve isolation in which the antenna can be separated through the segmenting portion formed in the housing 310.

Figure 8A:
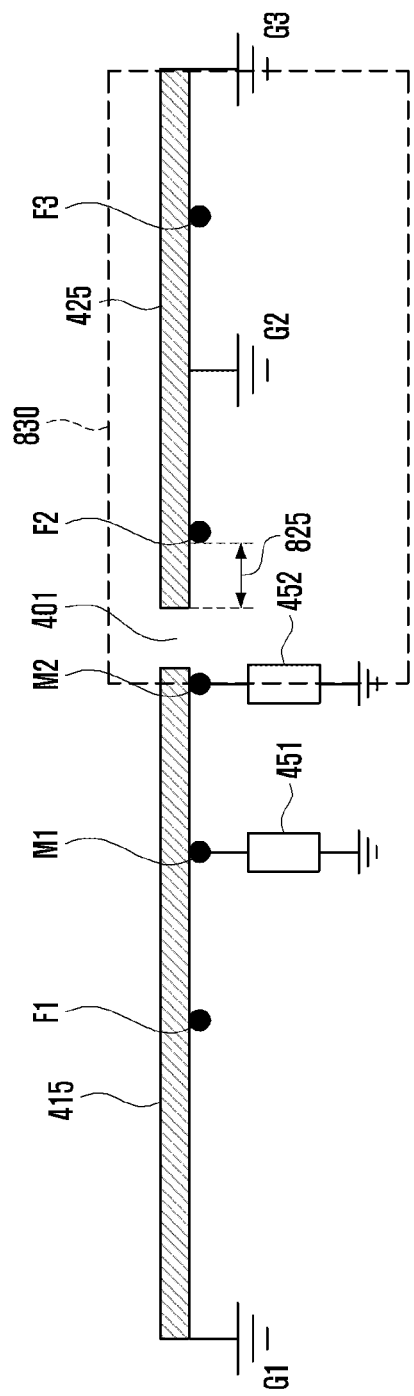
FIG. 8A is a diagram illustrating an operation principle of using, as a third antenna, a part of a first conductive portion and at least a part of a second conductive portion of an electronic device according to various example embodiments.
Figure 8B:
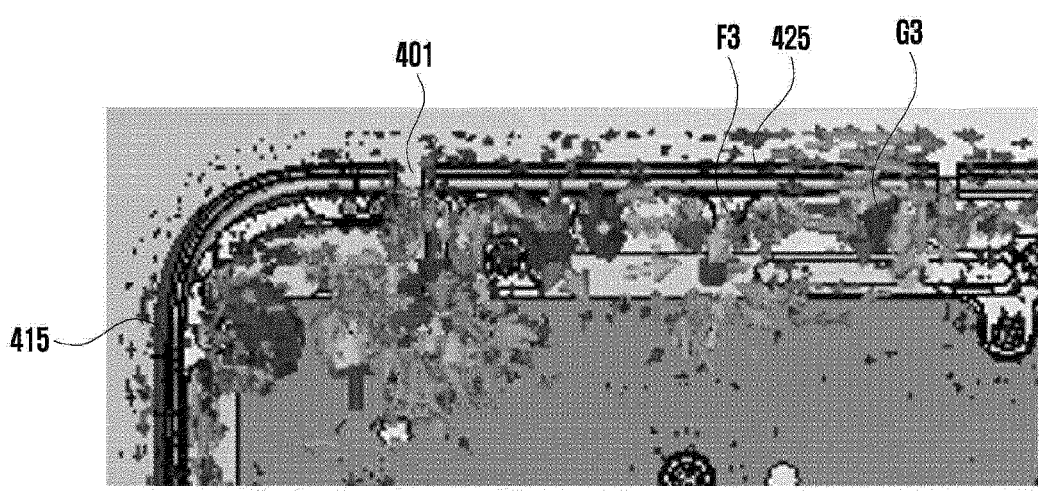
FIG. 8B is a diagram illustrating a flow of current applied to a part of a first conductive portion and at least a part of a second conductive portion according to various example embodiments.
Figure 8B:
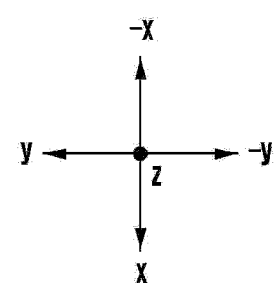
Figure 8C:
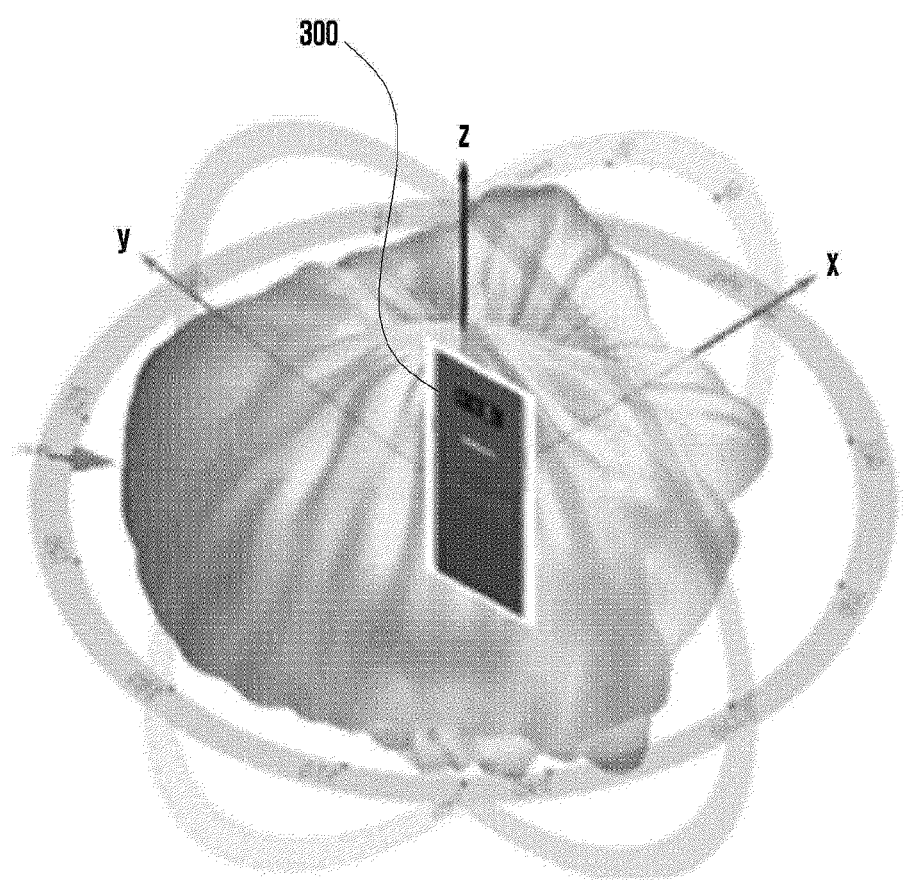
FIG. 8C is a diagram illustrating a radiation pattern of a third antenna of an electronic device according to various example embodiments.
Figure 8D:
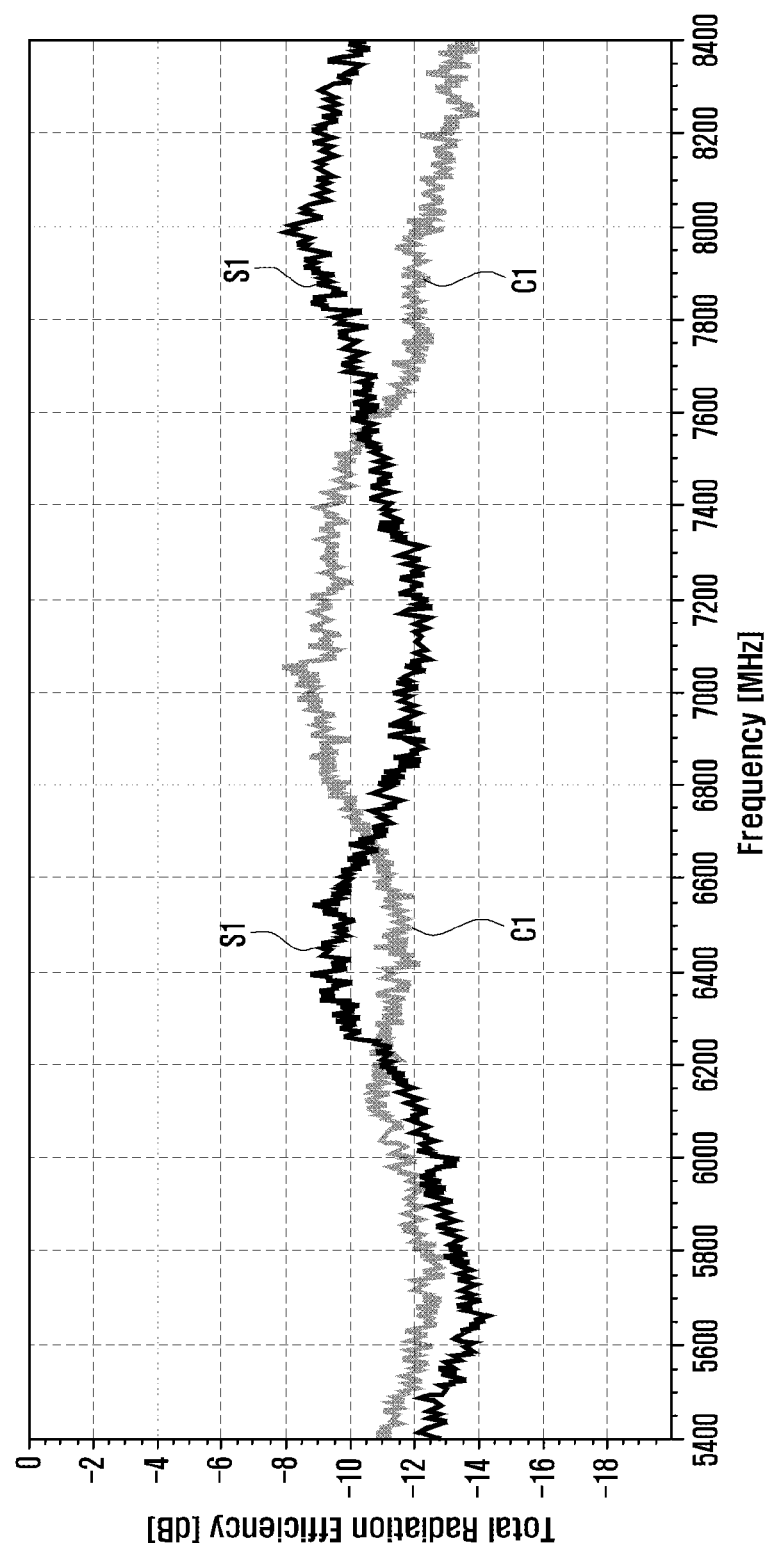
FIG. 8D is a diagram illustrating radiation efficiency for a third antenna of an electronic device according to various example embodiments and an antenna of an electronic device according to a comparative embodiment.

FIG. 8A is a diagram illustrating an operation principle of using, as a third antenna, a part of a first conductive portion and at least a part of a second conductive portion of an electronic device according to various example embodiments. FIG. 8B is a diagram illustrating a flow of current applied to a part of a first conductive portion and at least a part of a second conductive portion according to various example embodiments. FIG. 8C is a diagram illustrating a radiation pattern of a third antenna of an electronic device according to various example embodiments. FIG. 8D is a diagram illustrating radiation efficiency for a third antenna of an electronic device according to various example embodiments and an antenna of an electronic device according to a comparative embodiment.

In an embodiment, FIG. 8A is a diagram schematically showing configuration when the first conductive portion 415 and the second conductive portion 425 shown in FIGS. 4A to 4C according to various example embodiments are unfolded in a horizontal direction (e.g., the x-axis and negative x-axis directions).

In various embodiments, the second conductive portion 425 shown in FIG. 8A may be configured to include an extension part 825 extending in a direction (e.g., in the y-axis direction) of the first segmenting portion 401 from a point where the second feeding point F2 is formed, compared to FIGS. 4A and 4B. For example, the first segmenting portion 401 shown in FIGS. 4A and 4B is formed adjacent to the point where the second feeding point F2 is formed, but the first segmenting portion 401 shown in FIG. 8A may be formed at a location further away, as much as the extension part 825, from the point where the second feeding point F2 is formed.

With reference to FIGS. 8A and 8B, the electronic device 300 according to an example embodiment may use an end of the first conductive portion 415 and at least a part of the second conductive portion 425 as a radiator of a third antenna 830. The third antenna 830 may operate in a third frequency band. For example, the third antenna 830 may transmit and/or receive a signal of about 6.5 GHz to 8 GHz.

According to an embodiment, the third antenna 830 may support the third frequency band (e.g., about 6.5 GHz to 8 GHz) by using an end (e.g., in the negative y-axis direction, a point of the first conductive portion 415 where the second point M2 is formed) of the first conductive portion 415 and at least a part of the second conductive portion 425 under the control of the processor 450 or the wireless communication circuit 460. For example, the third antenna 830 may operate by using as a radiator the end (e.g., in the negative y-axis direction, a point of the first conductive portion 415 where the second point M2 is formed) of the first conductive portion 415 and a part of the second conductive portion 425 up to a placement point of the third ground portion G3.

With reference to FIG. 8B, in the third antenna 830, an electric field (e.g., current distribution) may be formed in a part of the first conductive portion 415 and at least a part of the second conductive portion 425. With reference to FIG. 8C, the third antenna 830 may form a radiation pattern having omnidirectional directivity with respect to the electronic device 300.

The electronic device 300 according to an example embodiment enables the first conductive portion 415 and the second conductive portion 425 disposed on the housing 310 to selectively share the first segmenting portion 401, and uses them as an antenna, thereby improving radiation performance (e.g., directivity) compared to a laser direct structuring (LDS) antenna according to a comparative embodiment disposed inside the housing 310.

With reference to FIG. 8D, it can be seen that the radiation efficiency S1 of the electronic device 300 according to an example embodiment, in which a part of the first conductive portion 415 and at least a part of the second conductive portion 425 sharing one segmenting portion (e.g., the first segmenting portion 401) are used as the third antenna 830, is improved, for example, in a frequency band of about 6250 MHz to 6650 MHz and a frequency band of about 7600 MHz to 8400 MHz, compared to the radiation efficiency C1 of the electronic device according to the comparative embodiment that uses an opening formed between the housing and the display without sharing a segmenting portion because there is no segmenting portion.

Figure 9:
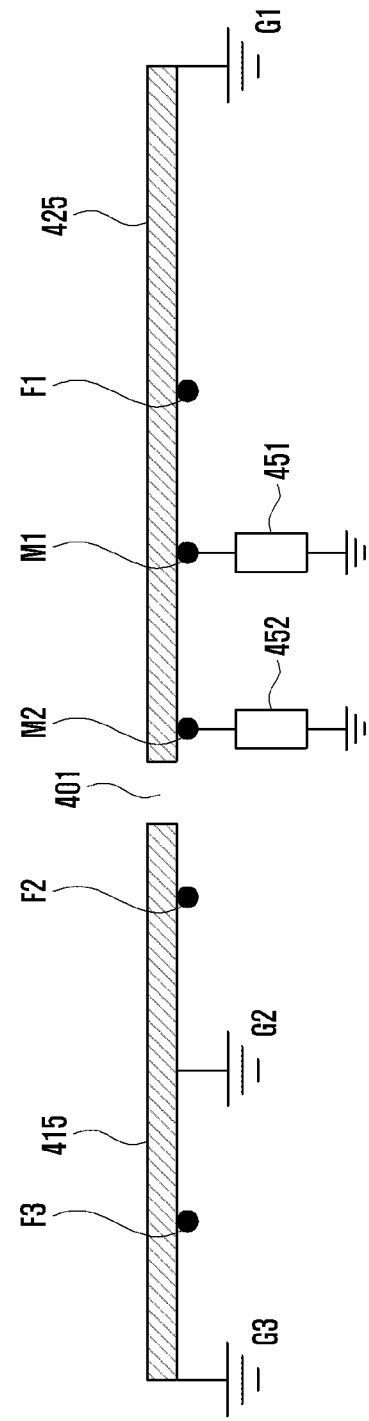
FIG. 9 is a diagram schematically illustrating various configurations of a first conductive portion and a second conductive portion of an electronic device according to various example embodiments.

FIG. 9 is a diagram schematically illustrating various configurations of a first conductive portion and a second conductive portion of an electronic device according to various example embodiments.

According to an embodiment, in the electronic device 300 shown in FIGS. 4A to 4C, the first conductive portion 415 may be disposed between the first segmenting portion 401 formed on the first side surface 410 and the second segmenting portions 402 formed on the second side surface 420, and the second conductive portion 425 may be disposed between the first segmenting portion 401 and the third segmenting portion 403 formed on the first side surface 410. According to various embodiments, the first ground portion G1, the first feeding point F1, the first point M1, and/or the second point M2 may be disposed inwardly from the second conductive portion 425, and also the second feeding point F2, the second ground portion G2, the third feeding point F3, and/or the third ground portion G3 may be disposed inwardly from the first conductive portion 415.

The electronic device 300 according to various example embodiments is not limited to the aforesaid positions and number of the first segmenting portion 401, the second segmenting portion 402, the third segmenting portion 403, the first conductive portion 415, and the second conductive portion 425, and various other embodiments may be possible as long as a plurality of antennas can share and use one segmenting portion (e.g., the first segmenting portion 401).

According to various embodiments, in the electronic device 300 according to various example embodiments, the first conductive portion 415 may be disposed on the first side surface 410, and the second conductive portion 425 may be disposed on the second side surface 420 and/or the third side surface 430. In the case that the first conductive portion 415 is disposed on the first side surface 410, the first conductive portion 415 may have inwardly the second feeding point F2, the second ground portion G2, the third feeding point F3, and/or the third ground portion G3. In the case that the second conductive portion 425 is disposed on the second side surface 420 and/or the third side surface 430, the second conductive portion 425 may have inwardly the first ground portion G1, the first feeding point F1, the first point M1, and/or the second point M2. In various embodiments, the positions and number of the first ground portion G1, the first feeding point F1, the first point M1, the second point M2, the second feeding point F2, the second ground portion G2, the third feeding point F3, and the third ground portion G3 are not limited to the above-described embodiment and may be variously changed and modified.

According to an example embodiment, an electronic device 101, 200, or 300 may include a housing 310 including a first side surface 410 and a second side surface 420; a support member 311 disposed inside the housing 310 and connected to a part of the first and second side surfaces 410 and 420; a first opening 406 formed between the first side surface 410 and the support member 311, and a second opening 408 formed among a part of the first side surface 410, the second side surface 420, and the support member 311; a printed circuit board 340 disposed on, directly or indirectly, the support member 311 and having a ground G; a first conductive portion 415 disposed between a first segmenting portion 401 formed in the first side surface 410 and a second segmenting portion 402 formed in the second side surface 420, and including a first ground portion G1, a first feeding point F1, a first point M1, and/or a second point M2; a second conductive portion 425 disposed between the first segmenting portion 401 and a third segmenting portion 403 formed in the first side surface 410, and including a second feeding point F2, a second ground portion G2, a third feeding point F3, and/or a third ground portion G3; a wireless communication circuit 460 electrically connected to the first feeding point F1, the second feeding point F2, and/or the third feeding point F3; a processor 450 electrically connected to the wireless communication circuit 460; and a first matching circuit 451 electrically connected to the ground G and the first point M1 and/or a second matching circuit 452 electrically connected to the ground G and the second point M2, wherein the first conductive portion 415 and at least a part of the second conductive portion 425 may be configured to operate as at least one antenna, depending on an operation of the first matching circuit 451 or the second matching circuit 452 corresponding to control of the processor 450.

According to an embodiment, the first conductive portion 415 and the at least a part of the second conductive portion 425 may be configured to operate as a plurality of antennas by sharing and using the first segmenting portion 401.

According to an embodiment, the first conductive portion 415 may be disposed in a "¬" shape between the first segmenting portion 401 and the second segmenting portion 402.

According to an embodiment, the first ground portion G1 may be disposed between the second segmenting portion 402 and the first feeding point F1, the second point M2 may be disposed between the first segmenting portion 401 and the first point M1, and the first point M1 may be disposed between the first feeding point F1 and the second point M2.

According to an embodiment, the second feeding point F2 may be disposed between the first segmenting portion 401 and the second ground portion G2, the third ground portion G3 may be disposed between the third segmenting portion 403 and the second feeding point F2, and the third feeding point F3 may be disposed between the second ground portion G2 and the third ground portion G3.

According to an embodiment, the processor 450 may be configured to adjust a matching value of the first matching circuit 451 and/or the second matching circuit 452, and to adjust an electrical length or path of an antenna including the first conductive portion 415 and/or the at least a part of the second conductive portion 425.

According to an embodiment, the first matching circuit 451 may include at least one inductor, and the second matching circuit 452 may include at least one capacitor.

According to an embodiment, the first conductive portion 415 electrically connected to the first and second matching circuits 451 and 452 and a part included in the second conductive portion 425 and corresponding to the second ground portion G2 may be configured to operate as a first antenna 610.

According to an embodiment, in a case that the first antenna 610 operates in a first frequency band, the processor 450 may control the first and second matching circuits 451 and 452 to be turned off, or control the first matching circuit 451 to be turned on and the second matching circuit 452 to be turned off.

According to an embodiment, in a case that the first and second matching circuits 451 and 452 are turned off, the first antenna 610 may be configured to operate in a frequency band of 700 MHz to 750 MHz.

According to an embodiment, in a case that the first matching circuit 451 is turned on and the second matching circuit 452 is turned off, the first antenna 610 may be configured to operate in a frequency band of 800 MHz to 1 GHz.

According to an embodiment, a part from the second ground portion G2 included in the second conductive portion 425 to the second point M2 included in the first conductive portion 415 and electrically connected to the second matching circuit 452 may be configured to operate as a second antenna 720.

According to an embodiment, in a case that the second antenna 720 operates in a second frequency band, the processor 450 may control the first matching circuit 451 to be turned off and the second matching circuit 452 to be turned on, or control the first and second matching circuits 451 and 452 to be turned on.

According to an embodiment, a part from the second point M2 included in the first conductive portion 415 and electrically connected to the second matching circuit 452 to the third ground portion G3 included in the second conductive portion 425 may be configured to operate as a third antenna 830 supporting a third frequency band.

According to an embodiment, the third antenna 830 may be configured to operate in a state where the first matching circuit 451 is turned on and/or off and the second matching circuit 452 is turned on and/or off.

According to an example embodiment, an electronic device 101, 200, or 300 may include a housing 310 including a first side surface 410 and a second side surface 420; a support member 311 disposed inside the housing 310 and connected, directly or indirectly, to a part of the first and second side surfaces 410 and 420; a first opening 406 formed between the first side surface 410 and the support member 311, and a second opening 408 formed among a part of the first side surface 410, the second side surface 420, and the support member 311; a printed circuit board 340 disposed on, directly or indirectly, the support member 311 and having a ground G; a first conductive portion 415 disposed between a first segmenting portion 401 formed in the first side surface 410 and a second segmenting portion 402 formed in the second side surface 420, and including a first ground portion G1, a first feeding point F1, a first point M1, and/or a second point M2; a second conductive portion 425 disposed between the first segmenting portion 401 and a third segmenting portion 403 formed in the first side surface 410, and including a second feeding point F2, a second ground portion G2, a third feeding point F3, and/or a third ground portion G3; a wireless communication circuit 460 electrically connected, directly or indirectly, to the first feeding point F1, the second feeding point F2, and/or the third feeding point F3; a processor 450 electrically connected, directly or indirectly, to the wireless communication circuit 460; and a first matching circuit 451 electrically connected, directly or indirectly, to the ground G and the first point M1 and/or a second matching circuit 452 electrically connected, directly or indirectly, to the ground G and the second point M2, wherein depending on an operation of the first matching circuit 451 or the second matching circuit 452 corresponding to control of the processor 450, the first conductive portion 415 electrically connected, directly or indirectly, to the first and second matching circuits 451 and 452 and a part included in the second conductive portion 425 and corresponding to the second ground portion G2 may be configured to operate as a first antenna 610, and wherein a part from the second ground portion G2 included in the second conductive portion 425 to the second point M2 included in the first conductive portion 415 and electrically connected, directly or indirectly, to the second matching circuit 452 may be configured to operate as a second antenna 720.

According to an embodiment, in a case that the first antenna 610 operates in a first frequency band, the processor 450 may control the first and second matching circuits 451 and 452 to be turned off, and/or control the first matching circuit 451 to be turned on and the second matching circuit 452 to be turned off.

According to an embodiment, in a case that the first and second matching circuits 451 and 452 are turned off, the first antenna 610 may be configured to operate in a frequency band of 700 MHz to 750 MHz.

Each embodiment herein may be used in combination with any other embodiment(s) described herein.

According to an embodiment, in a case that the first matching circuit 451 is turned on and the second matching circuit 452 is turned off, the first antenna 610 may be configured to operate in a frequency band of 800 MHz to 1 GHz.

According to an embodiment, in a case that the second antenna 720 operates in a second frequency band, the processor 450 may control the first matching circuit 451 to be turned off and the second matching circuit 452 to be turned on, or control the first and second matching circuits 451 and 452 to be turned on.

Hereinbefore, although the disclosure has been described using a variety of embodiments, it is natural that all changes and modifications made by those of ordinary skill in the art to which the disclosure pertains without departing from the technical scope of the disclosure also belong to the disclosure. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
   a housing including a first side surface and a second side surface;
   a support member, comprising a support, disposed at least partially inside the housing and connected to a part of the first and second side surfaces;
   a first opening between at least the first side surface and the support member, and a second opening provided among a part of the first side surface, the second side surface, and the support member;
   a printed circuit board disposed on the support member and comprising a ground;
   a first conductive portion, comprising conductive material, disposed between at least a first segmenting portion provided in the first side surface and a second segmenting portion provided in the second side surface, and including at least one of: a first ground portion, a first feeding point, a first point, and/or a second point;
   a second conductive portion, comprising conductive material, disposed between at least the first segmenting portion and a third segmenting portion provided in the first side surface, and including at least one of: a second feeding point, a second ground portion, a third feeding point, and/or a third ground portion;
   a wireless communication circuit electrically connected to at least one of the first feeding point, the second feeding point, and/or the third feeding point;
   a processor electrically connected to the wireless communication circuit; and
   a first matching circuit electrically connected to the ground and the first point and/or a second matching circuit electrically connected to the ground and the second point,
   wherein the first conductive portion and at least a part of the second conductive portion are configured to operate as at least one antenna, based on an operation of the first matching circuit and/or the second matching circuit based on control of the processor.

2. The electronic device of claim 1, wherein the first conductive portion and the at least a part of the second conductive portion are configured to operate as a plurality of antennas at least by sharing and using the first segmenting portion.

3. The electronic device of claim 1, wherein the first conductive portion is disposed in a "¬" shape between at least the first segmenting portion and the second segmenting portion.

4. The electronic device of claim 1, wherein the first ground portion is disposed between at least the second segmenting portion and the first feeding point,
   the second point is disposed between at least the first segmenting portion and the first point, and
   the first point is disposed between at least the first feeding point and the second point.

5. The electronic device of claim 1, wherein the second feeding point is disposed between at least the first segmenting portion and the second ground portion,
   the third ground portion is disposed between at least the third segmenting portion and the second feeding point, and
   the third feeding point is disposed between at least the second ground portion and the third ground portion.

6. The electronic device of claim 1, wherein the processor is configured to adjust a matching value of the first matching circuit and/or the second matching circuit, and to adjust an electrical length or path of an antenna including the first conductive portion and/or the at least a part of the second conductive portion.

7. The electronic device of claim 1, wherein the first matching circuit includes at least one inductor, and the second matching circuit includes at least one capacitor.

8. The electronic device of claim 1, wherein the first conductive portion is electrically connected to the first and second matching circuits and a part included in the second conductive portion and corresponding to the second ground portion are configured to operate as a first antenna.

9. The electronic device of claim 8, wherein based on operation of the first antenna in a first frequency band, the processor is configured to control the first and second matching circuits to be turned off, or to control the first matching circuit to be turned on and the second matching circuit to be turned off.

10. The electronic device of claim 9, wherein based on the first and second matching circuits being turned off, the first antenna is configured to operate in a frequency band of 700 MHz to 750 MHz.

11. The electronic device of claim 9, wherein based on the first matching circuit being on and the second matching circuit being off, the first antenna is configured to operate in a frequency band of 800 MHz to 1 GHz.

12. The electronic device of claim 8, wherein a part from the second ground portion included in the second conductive portion to the second point included in the first conductive portion and electrically connected to the second matching circuit is configured to operate as a second antenna.

13. The electronic device of claim 12, wherein based on operation of the second antenna in a second frequency band, the processor is configured to control the first matching circuit to be turned off and the second matching circuit to be turned on, or to control the first and second matching circuits to be turned on.

14. The electronic device of claim 1, wherein a part from the second point included in the first conductive portion and electrically connected to the second matching circuit to the third ground portion included in the second conductive portion is configured to operate as a third antenna supporting a third frequency band.

15. The electronic device of claim 14, wherein the third antenna is configured to operate at least in a state where the first matching circuit is turned on and/or off and the second matching circuit is turned on and/or off.

16. An electronic device comprising:
- a housing including a first side surface and a second side surface;
- a support member disposed at least partially inside the housing and connected to a part of the first and second side surfaces;
- a first opening between at least the first side surface and the support member, and a second opening provided in at least one of: a part of the first side surface, the second side surface, and the support member;
- a printed circuit board disposed on the support member and comprising a ground;
- a first conductive portion, comprising conductive material, disposed between at least a first segmenting portion provided at least partially in the first side surface and a second segmenting portion provided at least partially in the second side surface, and including at least one of: a first ground portion, a first feeding point, a first point, and/or a second point;
- a second conductive portion, comprising conductive material, disposed between at least the first segmenting portion and a third segmenting portion provided at least partially in the first side surface, and including at least one of: a second feeding point, a second ground portion, a third feeding point, and/or a third ground portion;
- a wireless communication circuit electrically connected to at least one of: the first feeding point, the second feeding point, and/or the third feeding point;
- a processor electrically connected to the wireless communication circuit; and
- a first matching circuit electrically connected to the ground and the first point and/or a second matching circuit electrically connected to the ground and the second point,
- wherein based on an operation of the first matching circuit and/or the second matching circuit corresponding to control of the processor, the first conductive portion electrically connected to the first and second matching circuits and a part included in the second conductive portion and corresponding to the second ground portion are configured to operate as a first antenna, and
- wherein a part from the second ground portion included in the second conductive portion to the second point included in the first conductive portion and electrically connected to the second matching circuit is configured to operate as a second antenna.

17. The electronic device of claim 16, wherein based on operation of the first antenna in a first frequency band, the processor is configured to control the first and second matching circuits to be turned off, and/or to control the first matching circuit to be turned on and the second matching circuit to be turned off.

18. The electronic device of claim 17, wherein based on the first and second matching circuits being turned off, the first antenna is configured to operate in a frequency band of 700 MHz to 750 MHz.

19. The electronic device of claim 17, wherein based on the first matching circuit being turned on and the second matching circuit being turned off, the first antenna is configured to operate in a frequency band of 800 MHz to 1 GHz.

20. The electronic device of claim 16, wherein based on operation of the second antenna in a second frequency band, the processor is configured to control the first matching circuit to be turned off and the second matching circuit to be turned on, and/or to control the first and second matching circuits to be turned on.

* * * * *